United States Patent
Shan et al.

(10) Patent No.: US 12,236,908 B2
(45) Date of Patent: Feb. 25, 2025

(54) SCREEN DISPLAY METHOD AND TERMINAL DEVICE

(71) Applicant: HONOR DEVICE CO., LTD., Shenzhen (CN)

(72) Inventors: Shuangshuang Shan, Shenzhen (CN); Wei Li, Shenzhen (CN); He Shen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/915,035

(22) PCT Filed: Apr. 26, 2022

(86) PCT No.: PCT/CN2022/089239
§ 371 (c)(1),
(2) Date: Sep. 27, 2022

(87) PCT Pub. No.: WO2023/015949
PCT Pub. Date: Feb. 16, 2023

(65) Prior Publication Data
US 2024/0221694 A1 Jul. 4, 2024

(30) Foreign Application Priority Data
Aug. 10, 2021 (CN) .......................... 202110911803.2

(51) Int. Cl.
*G09G 3/36* (2006.01)
*A63F 13/2145* (2014.01)
(Continued)

(52) U.S. Cl.
CPC ........... *G09G 3/36* (2013.01); *A63F 13/2145* (2014.09); *A63F 13/533* (2014.09);
(Continued)

(58) Field of Classification Search
CPC ............. G09G 3/36; G09G 2320/0252; G09G 2330/021; G09G 2340/0435;
(Continued)

(56) References Cited

U.S. PATENT DOCUMENTS 10,818,270 B2 * 10/2020 Bae ......................... G09G 5/393
11,069,327 B2 7/2021 Ji et al.
(Continued)

FOREIGN PATENT DOCUMENTS

CN 106919358 A 7/2017
CN 106933526 A 7/2017
(Continued)

*Primary Examiner* — Rodney Amadiz
(74) *Attorney, Agent, or Firm* — WOMBLE BOND DICKINSON (US) LLP

(57) ABSTRACT

This application provides a screen display method. The method includes: detecting a first touch operation of a user on a first screen of an application; displaying a second screen at a screen refresh rate equal to a frame rate of the application in response to the first touch operation, and determining whether the second screen is a target screen; when the second screen is the target screen, determining whether a second touch operation of the user on the second screen is detected; when the second touch operation is detected, determining whether a touch area corresponding to the second touch operation is a target area; when the touch area corresponding to the second touch operation is the target area, determining a target screen refresh rate based on the frame rate of the application; and displaying the second screen at the target screen refresh rate in response to the second touch operation.

20 Claims, 17 Drawing Sheets

(51) Int. Cl.
*A63F 13/533* (2014.01)
*G06F 3/04886* (2022.01)

(52) U.S. Cl.
CPC . *G06F 3/04886* (2013.01); *G09G 2320/0252* (2013.01); *G09G 2330/021* (2013.01); *G09G 2340/0435* (2013.01); *G09G 2354/00* (2013.01)

(58) Field of Classification Search
CPC .. G09G 2354/00; G09G 5/14; A63F 13/2145; A63F 13/533; G06F 3/04886; G06F 1/3215; G06F 3/04842; G06F 3/0488; G06F 1/3265; G06F 9/451; G06F 3/0412; G06F 3/0416
See application file for complete search history.

(56) References Cited

U.S. PATENT DOCUMENTS

| | | | |
|---|---|---|---|
| 11,183,095 | B2 | 11/2021 | Ranjan et al. |
| 11,574,576 | B1* | 2/2023 | Von Hippel ............ G09G 5/363 |
| 12,094,435 | B2* | 9/2024 | Weedermann ............ G06F 3/14 |
| 2016/0370915 | A1 | 12/2016 | Agarwal et al. |
| 2019/0182452 | A1* | 6/2019 | Choudha ............... G06F 3/0485 |
| 2020/0402478 | A1* | 12/2020 | Her ...................... G09G 3/3233 |
| 2021/0201731 | A1* | 7/2021 | Ranjan .................... G09G 3/20 |
| 2023/0028898 | A1* | 1/2023 | Xu ........................ G09G 5/005 |
| 2023/0091508 | A1* | 3/2023 | Shi ..................... G06F 3/04845 |
| | | | 345/204 |
| 2023/0222992 | A1* | 7/2023 | Zhang .................. G06F 3/1407 |
| | | | 345/204 |
| 2023/0377500 | A1* | 11/2023 | Huang ..................... G09G 3/20 |

FOREIGN PATENT DOCUMENTS

| | | |
|---|---|---|
| CN | 108646906 A | 10/2018 |
| CN | 110377251 A | 10/2019 |
| CN | 111583886 A | 8/2020 |
| CN | 111767013 A | 10/2020 |
| CN | 111816139 A | 10/2020 |
| CN | 112102780 A | 12/2020 |
| CN | 112118618 A | 12/2020 |
| CN | 112230758 A | 1/2021 |
| CN | 112256223 A | 1/2021 |
| CN | 112445315 A | 3/2021 |
| CN | 112578897 A | 3/2021 |
| CN | 113032065 A | 6/2021 |
| CN | 113129797 A | 7/2021 |
| EP | 3786935 A1 | 3/2021 |
| WO | 2018161578 A1 | 9/2018 |

\* cited by examiner

SCREEN DISPLAY METHOD AND TERMINAL DEVICE

CROSS-REFERENCE TO RELATED APPLICATIONS

This application is a national stage of International Application No. PCT/CN2022/089239 filed on Apr. 26, 2022, which claims priority to Chinese Patent Application No. 202110911803.2, filed on Aug. 10, 2021. The disclosures of each of the aforementioned applications are incorporated herein by reference in their entireties.

TECHNICAL FIELD

This application relates to the field of terminals, and in particular, to a screen display method and a terminal device.

BACKGROUND

Finger track of a terminal device is used to measure a time interval from touching a screen of the terminal device by a finger of a user to displaying of a first frame of picture on the screen as a response from the terminal device. For example, when the user slides or taps the screen of the terminal device, the screen can react accordingly based on a sliding gesture or a tapping action of the user. A shorter reaction time indicates better finger track. In some scenarios, such as a battle game and live streaming flash sale, the user has a high requirement on the finger track of the terminal device. In the battle game scenario, better finger track indicates a smoother game picture, a quicker screen response, and better user experience. In the live streaming flash sale scenario, better finger track indicates a quicker screen response, so that the user can buy favorite product more quickly.

The finger track can be improved by increasing a screen refresh rate, but an excessively high screen refresh rate may cause high power consumption of the terminal device. How to strike a balance between the finger track and the power consumption is an urgent technical problem to be resolved.

SUMMARY

This application provides a screen display method and a terminal device, which can strike a balance between finger track and power consumption of the terminal device, and is flexibly applicable to various application scenarios, so as to improve user experience.

According to a first aspect, this application provides a screen display method, including: detecting a first touch operation of a user on a first screen of an application, where the first touch operation is used to display a second screen of the application; displaying the second screen at a screen refresh rate equal to a frame rate of the application in response to the first touch operation, and determining whether the second screen is a target screen, where the target screen is at least one preset screen in the application; when the second screen is the target screen, determining whether a second touch operation of the user on the second screen is detected; when the second touch operation is detected, determining whether a touch area corresponding to the second touch operation is a target area, where the target area is at least one preset area on the target screen; when the touch area corresponding to the second touch operation is the target area, determining a target screen refresh rate based on the frame rate of the application, where the target screen refresh rate is greater than or equal to the frame rate of the application; and displaying the second screen at the target screen refresh rate in response to the second touch operation.

The first touch operation and the second touch operation may be operations such as dragging, sliding, tap, or double-tap, which is not limited in this application.

Operation gestures of the first touch operation and the second touch operation may be the same or different, which is not limited in this application.

In response to the first touch operation, the terminal device may obtain the frame rate of the application, and display the second screen at a screen refresh rate equal to the frame rate of the application, that is, a current screen refresh rate is equal to the frame rate of the application.

The application may be any application provided with a target screen, for example, a game application or alive streaming application. The target screen may be any screen provided with a target area. For example, for an in-game screen of the game application, the target area is an area in which a skill icon is located.

Optionally, the target area may be changed based on a touch operation of the user. For example, the terminal device may collect touch operations of the user for a time period, record touch areas corresponding to the touch operations of the user, and determine a touch area with most touches in the time period as the target area.

Usually, a screen refresh rate may have an upper limit. When the touch area corresponding to the second touch operation is the target area, the terminal device may obtain the frame rate of the application; or when the frame rate of the application is less than the upper limit of the screen refresh rate, the terminal device may adjust the target screen refresh rate to be greater than the frame rate of the application.

It should be understood that, when the screen refresh rate has an upper limit, the target screen refresh rate is less than or equal to the upper limit of the screen refresh rate. In particular, when the frame rate of the application is equal to the upper limit of the screen refresh rate, the terminal device may not adjust the target screen refresh rate.

According to the screen display method provided in this embodiment of this application, the screen provided with a target area is set as the target screen; and on the target screen, when the touch area corresponding to the touch operation of the user is the target area, the screen refresh rate is adjusted to be greater than the frame rate of the application, so as to shorten a finger track latency of the game, and improve touch experience of the user. In this embodiment of this application, adjustment is performed based on a preset target area of the target screen, and the screen refresh rate does not remain constant in the entire application. Therefore, this embodiment of this application strikes a balance between the finger track and the power consumption of the terminal device, thereby improving user experience.

With reference to the first aspect, in some implementations of the first aspect, when the frame rate of the application is equal to the upper limit of the screen refresh rate, the target screen refresh rate is equal to the frame rate of the application; or when the frame rate of the application is less than the upper limit of the screen refresh rate, the target screen refresh rate is greater than the frame rate of the application, and is less than or equal to the upper limit of the screen refresh rate.

With reference to the first aspect, in some implementations of the first aspect, the target screen refresh rate is greater than the frame rate of the application; after the displaying the second screen at the target screen refresh rate in response to the second touch operation, the method further includes: determining whether a third screen touch operation of the user on the second screen is detected; and adjusting the target screen refresh rate based on a detection status of the third touch operation.

According to the screen display method provided in this embodiment of this application, when the target screen refresh rate is greater than the frame rate of the application, the terminal device may adjust the target screen refresh rate based on the detection status of the third touch operation, so as to dynamically adjust the screen refresh rate, strike a balance between finger track and power consumption of the terminal device, ensure picture smoothness, and improve user experience.

With reference to the first aspect, in some implementations of the first aspect, the method further includes: recording an operation time of the second touch operation, and determining the operation time of the second touch operation as a target time; the adjusting the target screen refresh rate based on a detection status of the third touch operation includes: if the third touch operation is not detected, recording, based on the target time, duration of a touch operation corresponding to the target time; and when the duration is greater than or equal to preset duration, adjusting the target screen refresh rate to be equal to the frame rate of the application.

According to the screen display method provided in this embodiment of this application, when the target screen refresh rate is greater than the frame rate of the application, and the terminal device does not detect a touch operation of the user within the preset duration, the terminal device adjusts the target screen refresh rate to be equal to the frame rate of the application, that is, the terminal device does not need to display the second screen always at the target screen refresh rate greater than the frame rate of the application. When the foregoing conditions are met, the second screen may be displayed at the target screen refresh rate equal to the frame rate of the application. The screen refresh rate can be dynamically adjusted to strike a balance between finger track and power consumption of the terminal device, ensure picture smoothness, and improve user experience.

With reference to the first aspect, in some implementations of the first aspect, the adjusting the target screen refresh rate based on the detection status of the third touch operation includes: if the third touch operation is detected, determining whether a touch area corresponding to the third touch operation is the target area; when the touch area corresponding to the third touch operation is not the target area, recording, based on the target time, duration of a touch operation corresponding to the target time; and when the duration is greater than or equal to the preset duration, adjusting the target screen refresh rate to be equal to the frame rate of the application.

According to the screen display method provided in this embodiment of this application, when the target screen refresh rate is greater than the frame rate of the application, and within the preset duration, when the terminal device detects a touch operation of the user but a touch area corresponding to the touch operation is not the target area, the target screen refresh rate is adjusted to be equal to the frame rate of the application. That is, the terminal device does not need to display the second screen always at the target screen refresh rate greater than the frame rate of the application. When the foregoing conditions are met, the second screen may be displayed at the target screen refresh rate equal to the frame rate of the application. The screen refresh rate can be dynamically adjusted to strike a balance between finger track and power consumption of the terminal device, ensure picture smoothness, and improve user experience.

With reference to the first aspect, in some implementations of the first aspect, the method further includes: when the touch area corresponding to the third touch operation is the target area, recording an operation time of the third touch operation, and updating the target time to the operation time of the third touch operation.

With reference to the first aspect, in some implementations of the first aspect, the application is a game application, the target screen is a battle screen, and the target area is an area in which a skill icon is located in the battle screen.

According to a second aspect, an embodiment of this application provides a terminal device, including a detection module and a processing module. The detection module is configured to detect a first touch operation of a user on a first screen of an application, where the first touch operation is used to display a second screen of the application. The processing module is configured to: display the second screen at a screen refresh rate equal to a frame rate of the application in response to the first touch operation, and determine whether the second screen is a target screen, where the target screen is at least one preset screen in the application; when the second screen is the target screen, determine whether a second touch operation of the user on the second screen is detected; when the second touch operation is detected, determine whether a touch area corresponding to the second touch operation is a target area, where the target area is at least one preset area on the target screen; when the touch area corresponding to the second touch operation is the target area, determine a target screen refresh rate based on the frame rate of the application, where the target screen refresh rate is greater than or equal to the frame rate of the application; and display the second screen at the target screen refresh rate in response to the second touch operation.

With reference to the second aspect, in some implementations of the second aspect, when the frame rate of the application is equal to an upper limit of a screen refresh rate, the target screen refresh rate is equal to the frame rate of the application; or when the frame rate of the application is less than the upper limit of the screen refresh rate, the target screen refresh rate is greater than the frame rate of the application, and is less than or equal to the upper limit of the screen refresh rate.

With reference to the second aspect, in some implementations of the second aspect, the target screen refresh rate is greater than the frame rate of the application; and the processing module is further configured to determine whether a third screen touch operation of the user on the second screen is detected; and adjust the target screen refresh rate based on a detection status of the third touch operation.

With reference to the second aspect, in some implementations of the second aspect, the processing module is further configured to: record an operation time of the second touch operation, and determine the operation time of the second touch operation as a target time; if the third touch operation is not detected, record, based on the target time, duration of a touch operation corresponding to the target time; and when the duration is greater than or equal to preset duration, adjust the target screen refresh rate to be equal to the frame rate of the application.

With reference to the second aspect, in some implementations of the second aspect, the processing module is further configured to: if the third touch operation is detected, determine whether a touch area corresponding to the third touch operation is the target area; when the touch area corresponding to the third touch operation is not the target area, record, based on the target time, duration of a touch operation corresponding to the target time; and when the duration is greater than or equal to the preset duration, adjust the target screen refresh rate to be equal to the frame rate of the application.

With reference to the second aspect, in some implementations of the second aspect, the processing module is further configured to: when the touch area corresponding to the third touch operation is the target area, record an operation time of the third touch operation, and update the target time to the operation time of the third touch operation.

With reference to the second aspect, in some implementations of the second aspect, the application is a game application, the target screen is a battle screen, and the target area is an area in which a skill icon is located in the battle screen.

According to a third aspect, this application provides a terminal device, including a processor. The processor is coupled to a memory, and may be configured to execute instructions in the memory, to implement the method according to any one of the first aspect or the possible implementations of the first aspect. Optionally, the terminal device further includes the memory. Optionally, the terminal device further includes a communication interface, and the processor is coupled to the communication interface.

According to a fourth aspect, this application provides a processor, including an input circuit, an output circuit, and a processing circuit. The processing circuit is configured to receive a signal by using the input circuit, and transmit a signal by using the output circuit, so that the processor performs the method according to any one of the first aspect or the possible implementations of the first aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter and transmitted by the transmitter. Further, the input circuit and the output circuit may be a same circuit, and the circuit is separately used as the input circuit and the output circuit at different moments. Specific implementations of the processor and various circuits are not limited in this application.

According to a fifth aspect, this application provides a processing apparatus, including a processor and a memory. The processor is configured to read instructions stored in the memory, receive a signal by using a receiver, and transmit a signal by using a transmitter, to perform the method according to any one of the first aspect or the possible implementations of the first aspect.

Optionally, there are one or more processors, and there are one or more memories.

Optionally, the memory may be integrated with the processor, or may be disposed separately from the processor.

In a specific implementation process, the memory may be a non-transitory (non-transitory) memory, such as a read-only memory (read-only memory, ROM). The memory and the processor may be integrated on one same chip, or may be separately disposed on different chips. A type of the memory and disposing manners of the memory and the processor are not limited in this application.

It should be understood that there are related data interaction processes, for example, sending indication information may be a process of outputting the indication information from the processor, and receiving capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus according to the fifth aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory, where the memory may be integrated into the processor, or may be located outside the processor and exist independently.

According to a sixth aspect, this application provides a computer-readable storage medium. The computer-readable storage medium stores a computer program (which may also be referred to as code or an instruction). When the computer program is run on a computer, the computer is enabled to perform the method according to any one of the first aspect or the possible implementations of the first aspect.

According to a seventh aspect, this application provides a computer program product. The computer program product includes a computer program (which may also be referred to as code or an instruction). When the computer program is run, the computer is enabled to perform the method according to any one of the first aspect or the possible implementations of the first aspect.

DESCRIPTION OF EMBODIMENTS

The following describes technical solutions in this application with reference to accompanying drawings.

For ease of clearly describing the technical solutions in the embodiments of this application, in the embodiments of this application, words such as "first" and "second" are used to distinguish same items or similar items whose functions and effects are basically the same. For example, a first instruction and a second instruction are used to distinguish different user instructions, and a sequence thereof is not limited. A person skilled in the art may understand that the words such as "first" and "second" do not limit a quantity and an execution order, and the words such as "first" and "second" do not necessarily indicate a difference.

It should be noted that, in this application, words such as "for example" or "such as" are used to indicate an example, illustration, or description. Any embodiment or design solution described as "for example" or "such as" in this application should not be explained as being preferred or advantageous over other embodiments or design solutions. Specifically, use of the words such as "for example" or "such as" is intended to present related concepts in a specific manner.

In addition, "at least one" means one or more, and "a plurality of" means two or more. "And/or" describes an association relationship between associated objects, and indicates that three relationships may exist. For example, A and/or B may indicate the following: Only A exists, both A and B exist, and only B exists, where A and/or B may indicate a singular or plural form. The symbol "/" generally represents an "or" relationship between associated objects. "At least one of the following items" or other similar expressions represent any combination of these items, including any combination of a singular or a plural. For example, "at least one of a, b, or c" may represent a, or b, or c, or a and b, or a and c, or b and c, or a, b, and c, where a, b, and c may be a singular or plural.

Figure 1:
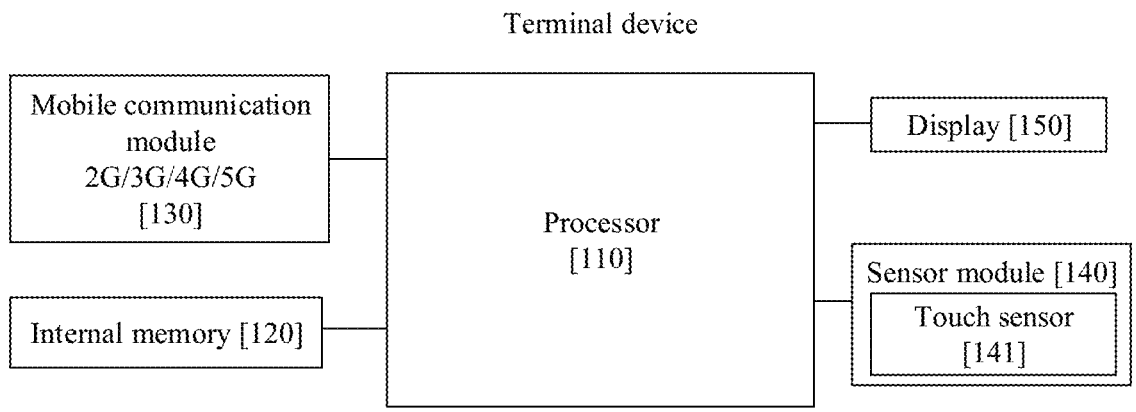
FIG. 1 is a schematic diagram of a structure of a terminal device according to an embodiment of this application.

To better understand the embodiments of this application, the following describes a hardware structure of a terminal device according to an embodiment of this application. For example, FIG. 1 is a schematic diagram of a structure of a terminal device according to an embodiment of this application.

The terminal device may include a processor 110, an internal memory 120, a mobile communication module 2G/3G/4G/5G 130, a sensor module 140, a display 150, and the like. The sensor module 140 may include a touch sensor 141.

Optionally, the sensor module 140 may further include a pressure sensor, a gyro sensor, a barometric pressure sensor, a magnetic sensor, an acceleration sensor, a distance sensor, an optical proximity sensor, a fingerprint sensor, a temperature sensor, an ambient light sensor, a bone conduction sensor, and the like.

It can be understood that a structure shown in this embodiment of this application does not constitute a specific limitation on the terminal device. In some other embodiments of this application, the terminal device may include more or fewer components than those shown in the figure, or combine some components, or split some components, or have different component arrangements. The components shown in the figure may be implemented by hardware, software, or a combination of software and hardware.

The processor 110 may include one or more processing units. Different processing units may be independent components, or may be integrated into one or more processors. The processor 110 may be further provided with a memory for storing instructions and data.

The internal memory 120 may be configured to store computer executable program code, and the executable program code includes instructions. The internal memory 120 may include a program storage area and a data storage area.

The mobile communication module 2G/3G/4G/5G 130 may provide wireless communication solutions, such as 2G/3G/4G/5G, that are applied to the terminal device. The mobile communication module 130 may include at least one filter, a switch, a power amplifier, a low-noise amplifier (low noise amplifier, LNA), and the like.

The terminal device implements a display function by using a graphics processing unit (graphics processing unit, GPU), the display 150, an application processor, and the like. The GPU is an image processing microprocessor, which is connected to the display 150 and the application processor. The GPU is configured to perform mathematical and geometric calculations to render graphics.

The display 150 is configured to display an image, a video, and the like. The display 150 includes a display panel. In some embodiments, the terminal device may include one or N displays 150, where N is a positive integer greater than 1.

The touch sensor 141 may be disposed on the display 150, and the touch sensor 141 and the display 150 form a touch panel, which is also referred to as a "touchscreen".

Optionally, the terminal device may further include a mouse or a touchpad, to control a pointer to control the terminal device.

A software system of the terminal device may use a hierarchical architecture, an event-driven architecture, a microkernel architecture, a micro-service architecture, or a cloud architecture. The hierarchical architecture may be an Android (Android) system, an Apple (IOS) system, or another operating system. This is not limited in this embodiment of this application.

The following uses the Android system with the hierarchical architecture as an example to illustrate a software architecture of the terminal device.

Figure 2:
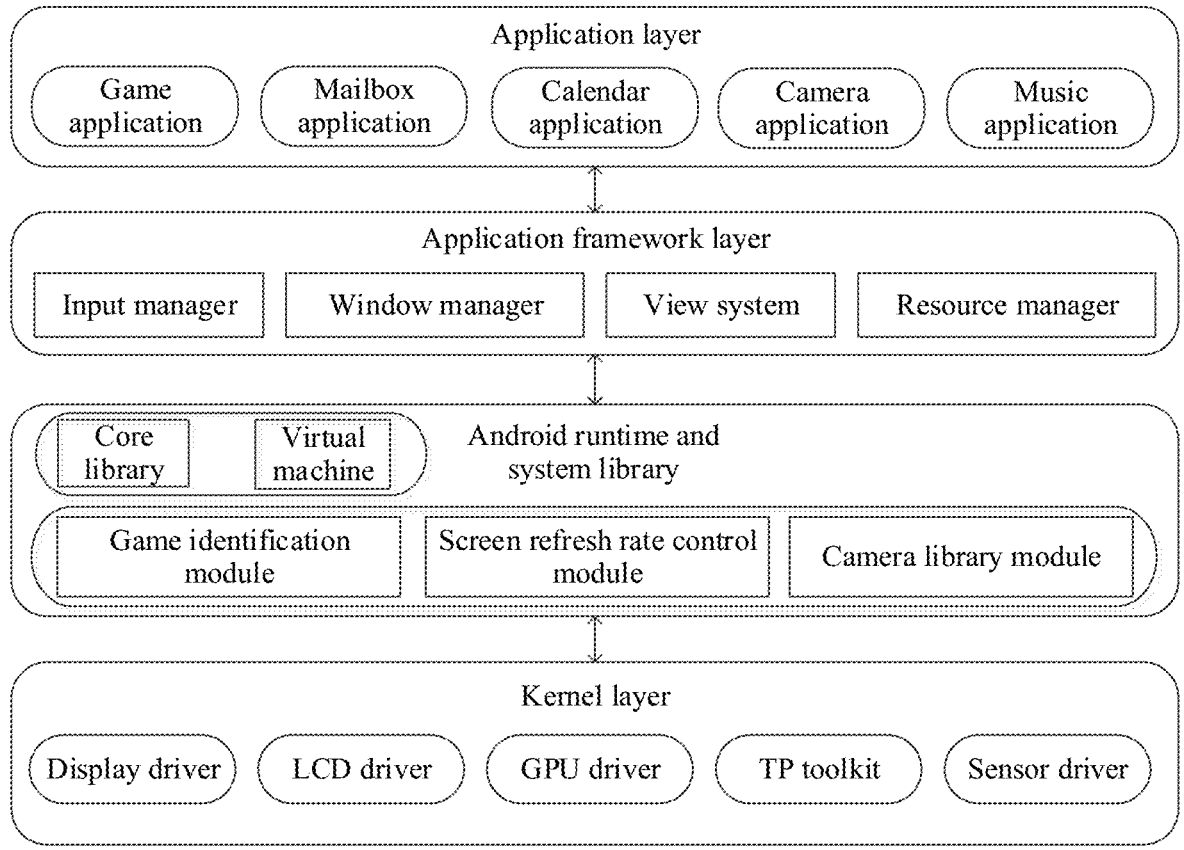
FIG. 2 is a schematic block diagram of a software architecture of a terminal device according to an embodiment of this application.

FIG. 2 is a block diagram of a software architecture of a terminal device applicable to an embodiment of this application. The hierarchical architecture divides a software system of the terminal device into several layers, and each layer has a clear role and division of labor. The layers communicate with each other by using a software interface. In some embodiments, the Android system may be sequentially divided into four layers from top to bottom: an application (applications) layer, an application framework (application framework) layer, an Android runtime (Android runtime) and a system library, and a kernel (kernel) layer.

The application layer may include a series of application packages. The application layer runs an application by invoking an application programming interface (application programming interface, API) provided by the application framework layer. As shown in FIG. 2, the application packages may include applications such as a game application, a mailbox application, a calendar application, a camera application, and a music application.

The application framework layer provides APIs and programming framework for the applications at the application layer. The application framework layer includes some predefined functions. As shown in FIG. 2, the application framework layer may include an input manager, a window manager, a view system, a resource manager, and the like. The input manager is configured to receive an input from a user, for example, receive a touch operation of the user. The window manager is configured to manage a window program. The window manager may obtain a display size, determine whether there is a status bar, lock a screen, take a screenshot, and the like. The view system may be used to build an application. The display interface may include one or more views. For example, a display interface including a game notification icon may include a view for displaying text and a view for displaying a picture. The resource manager provides various resources for an application, such as a localized string, an icon, a picture, a layout file, and a video file.

The Android runtime includes a core library and a virtual machine. The Android runtime is responsible for dispatching and managing the Android system. The core library includes two parts: one part is functions that need to be invoked by a Java language, and the other part is the core library of Android. The application layer and the application framework layer run in a virtual machine. The virtual machine executes Java files at the application layer and the application framework layer as binary files. The virtual machine is configured to implement functions such as object lifecycle management, stack management, thread management, security and exception management, and recycling of waste. The system library may include a plurality of library modules. The library modules may be a game identification module, a screen refresh rate control module, a camera library module, and the like. The game identification module may be configured to identify game scenario screens, such as a loading screen, a login screen, a lobby screen, and an in-game screen of a game. The screen refresh rate control module may be configured to adjust a screen refresh rate, for example, adjust the screen refresh rate to be greater than or equal to a frame rate of an application. The Android system may load a corresponding library module for device hardware, to implement accessing of the device hardware by the application framework layer.

The kernel layer is a layer between hardware and software. The kernel layer is used to drive hardware, so that the hardware works. The kernel layer includes at least a display driver, a liquid crystal display (liquid crystal display, LCD) driver, a graphics processing unit (graphics processing unit, GPU) driver, a TP toolkit, a sensor driver, and the like. This is not limited in this embodiment of this application. For example, the LCD driver may drive an LCD to display a picture.

The terminal device in this embodiment of this application may be a wearable terminal device, for example, a mobile phone, a tablet computer, a personal computer (personal computer, PC), or a smartwatch, or may be various teaching aids (such as a learning machine and an early education machine), a smart toy, a portable robot, a personal digital assistant (personal digital assistant, PDA), an augmented reality (augmented reality, AR) device, a virtual reality (virtual reality, VR) device, or the like. It should be understood that a specific technology and a specific device form used by the terminal device are not limited in this embodiment of this application.

To facilitate understanding of the embodiments of this application, related technologies in the embodiments of this application are described.

1. Finger track is used to measure a time interval from touching a screen of the terminal device by a finger of a user to displaying of a first frame of picture on the screen as a response from the terminal device. When the user slides or taps the screen of the terminal device, the screen can react accordingly based on a sliding gesture or a tapping action of the user. A shorter reaction time indicates better finger track.

2. Screen refresh rate refers to a quantity of times an electron beam repeatedly scans an image on a screen. A higher refresh rate indicates a higher stability of a picture displayed on the screen.

3. Frame rate is a frequency or a rate at which a bitmap image in a unit of frame is continuously displayed on a display. A unit of the frame rate is hertz (Hz).

In some scenarios, such as a battle game and live streaming flash sale, a user has a high requirement on the finger track of the terminal device. In the battle game scenario, when the user taps a skill in the battle scenario, better finger track indicates a smoother picture displayed by the skill, a quicker screen response, and better battle experience of the user. In the live streaming flash sale scenario, when the user taps a buy icon in the flash sale scenario, better finger track indicates a quicker screen response and a more quickly displayed payment screen, so that the user can buy favorite product more quickly.

The following uses an example in which a terminal device is a mobile phone and a scenario is a game scenario to describe an embodiment of this application in detail.

Figure 3:
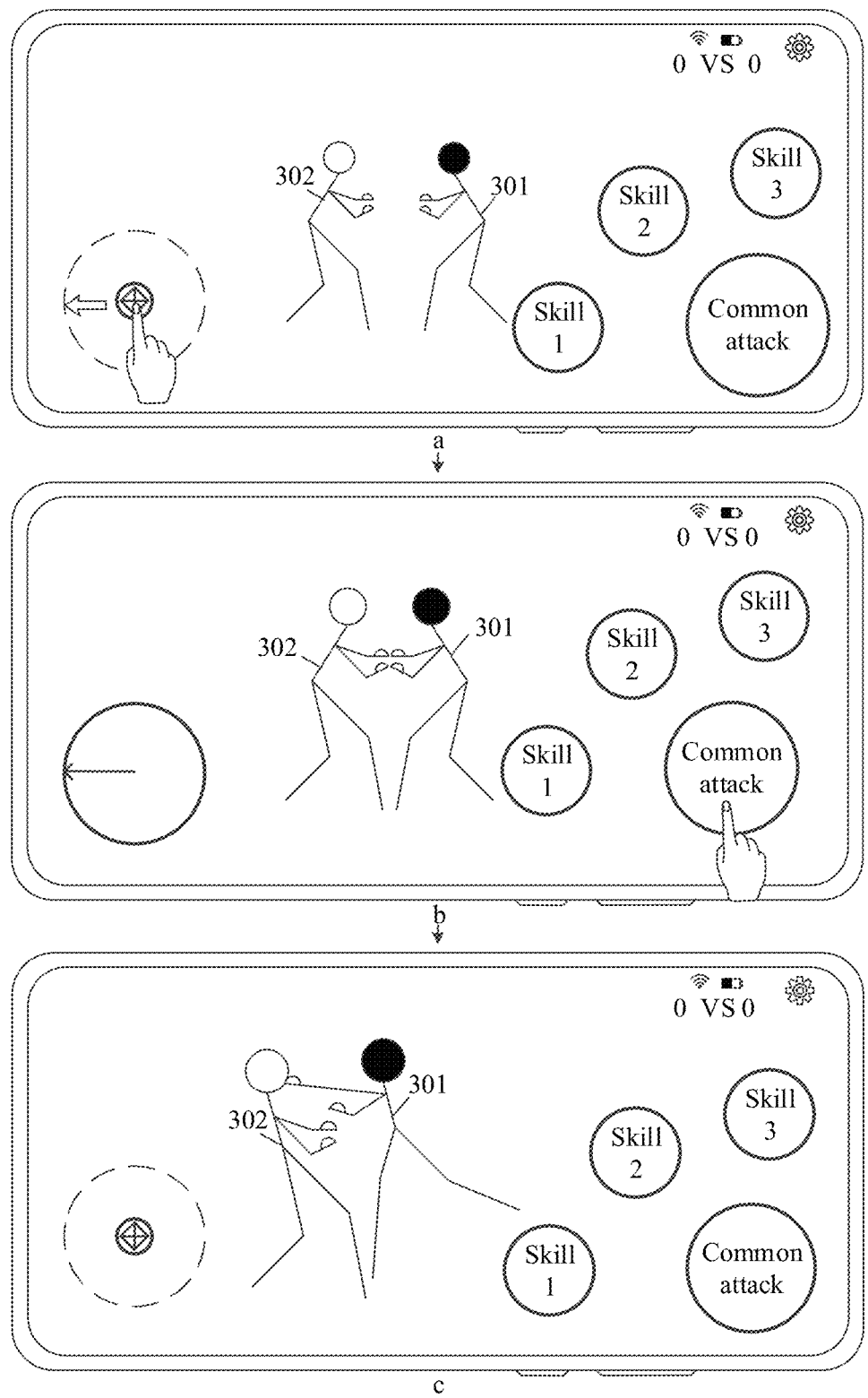
FIG. 3 is a schematic diagram of a screen of a mobile phone-based game application.

FIG. 3 is a schematic diagram of a screen of a mobile phone-based game application. As shown on screen a in FIG. 3, the screen a may include a game character 301, a game character 302, a movement icon, a skill 1 icon, a skill 2 icon, a skill 3 icon, and a common skill icon. The screen may further include scores of the game character 301 and the game character 302, a setting icon, and the like.

The user may control the game character 301 to move up, down, left, or right by sliding the movement icon to extend the movement icon to a position of a dashed circle. The user may further control, by tapping the skill 1 icon, the skill 2 icon, the skill 3 icon, or the common skill icon, the game character 301 to release a skill 1, a skill 2, a skill 3, or a common skill.

The user slides the movement icon to the left to expand the movement icon to the position of the dashed circle. After detecting that a movement control is triggered to the left, the mobile phone displays screen b in FIG. 3. As shown on the screen b in FIG. 3, a position of the game character 301 is to the left of the position of the game character 301 on the screen a in FIG. 3, that is, the mobile phone moves the game character 301 to the left based on a sliding gesture of the user.

The user taps a common attack icon. After detecting that a common attack control is triggered, the mobile phone displays screen c in FIG. 3. As shown on the screen c in FIG. 3, the game character 301 releases a common attack, that is, the game character 301 punches the game character 302.

When the user slides the movement icon to the left or taps the common skill icon, the mobile phone can detect that controls corresponding to the movement icon or the common skill icon are triggered, and then respond in a timely manner.

Figure 4:
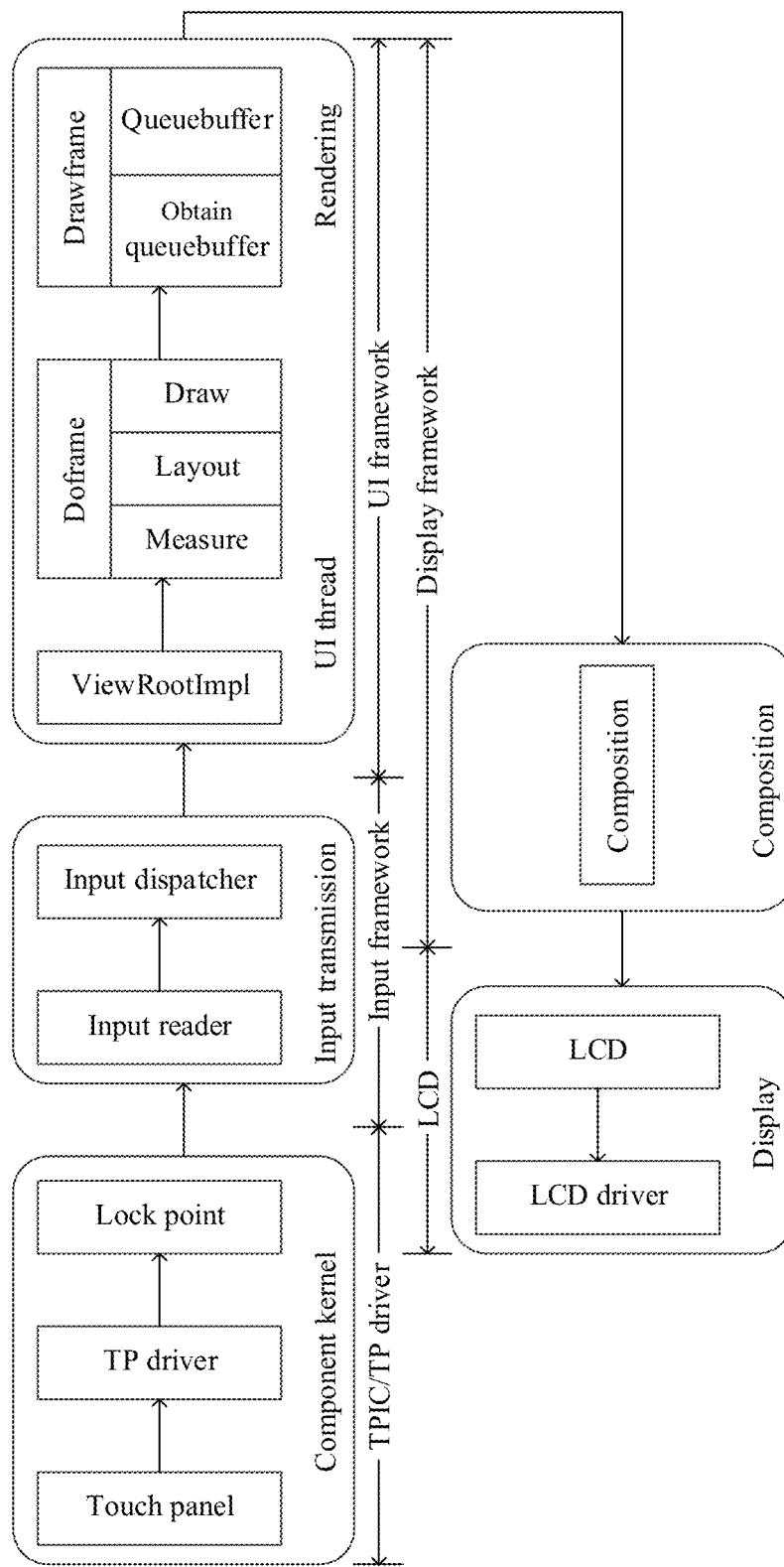
FIG. 4 is a schematic diagram of a process in which a mobile phone responds after detecting that a control is triggered.

FIG. 4 is a schematic diagram of a process in which a mobile phone responds after detecting that a control is triggered. As shown in FIG. 4, the mobile phone may go through five processes to respond. The five processes include a component kernel, input transmission, a user interface (user interface, UI) thread, rendering, composition, and displaying. When responding, the mobile phone needs to sequentially go through the component kernel, the input transmission, the UI thread, the rendering, the composition, and the displaying. Therefore, a response time of the mobile phone may include a component kernel latency, an input transmission latency, a UI thread latency, a rendering latency, a composition latency, and a displaying latency. The component kernel may be implemented by using a touch panel (Touch Panel) function, a TP driver (TP Driver) function, and a lock point in a TPIC/TP driver (TPIC/TP driver). The input transmission may be implemented by using an input reader (Input Reader) function and an input dispatcher (Input Dispatcher) function in an input framework (Input Framework). The UI thread and the rendering may be implemented by using a ViewRootImpl (ViewRootImpl) function, a doframe (DoFrame) function, and a drawframe (DrawFrame) function in a UI framework. The doframe (DoFrame) function further includes a measure (Measure) function, and a layout (Layout) function, and a draw (Draw) function. The drawframe (DrawFrame) function further includes an acquire queuebuffer (FushCommands) function and a queuebuffer (QueueBuffer) function. The composition may be implemented by using a composite function (for example, OnMessageReceived) in a display framework (Display Framework). The displaying can be implemented by using an LCD driver (LCD Driver) function and an LCO panel (LCD Panel) function of the LCD.

It should be understood that the mobile phone may shorten any one of the component kernel latency, the input transmission latency, the user interface (user interface, UI) thread latency, the rendering latency, the composition latency, and the display latency, so as to improve finger track.

The finger track may alternatively be improved by increasing a screen refresh rate. By increasing the screen refresh rate, the mobile phone shortens the rendering latency and the composition latency, so as to shorten a finger track latency of the application and improve touch experience of the user. However, in a current method for increasing a screen refresh rate, the screen refresh rate is increased at an application layer, and the screen refresh rate remains unchanged when an application is being used. Consequently, power consumption of a terminal device is high.

For example, in a game application, game scenario screens include a loading screen, a login screen, a lobby screen, an in-game screen, and the like. To improve finger track of the game application in a game process of a user, a screen refresh rate of the in-game screen is usually high. In most cases, the screen refresh rate remains unchanged throughout a game until the game ends, causing high power consumption of the terminal device.

In view of this, embodiments of this application provide a screen display method and a terminal device. A target area may be set on a screen of an application. When a touch area corresponding to a touch operation of a user is the target area, a screen refresh rate of a current screen is increased (that is, the screen refresh rate is adjusted to be greater than a frame rate of the application). When a touch area corresponding to a touch operation of the user is not the target area, the screen refresh rate of the current screen is lowered (that is, the screen refresh rate is adjusted to be equal to the frame rate of the application). This can strike a balance between finger track and power consumption of the terminal device, and is flexibly applicable to various application scenarios, thereby improving user experience.

Figure 5:
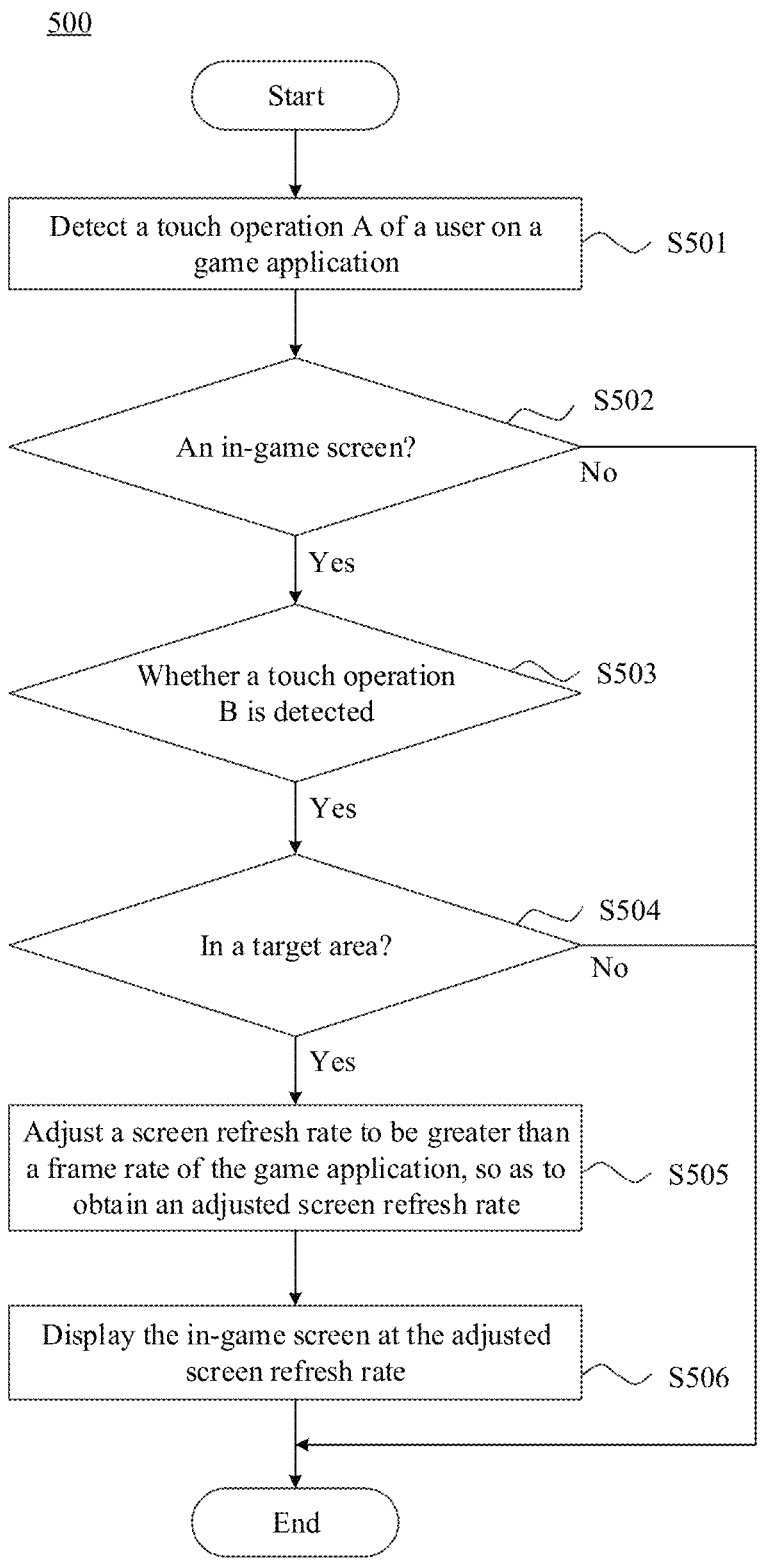
FIG. 5 is a schematic flowchart of a screen display method according to an embodiment of this application.

FIG. 5 is a schematic flowchart of a screen display method 500. The method 500 may be performed by the foregoing terminal device, for example, the mobile phone. The method 500 is applicable to the scenario in FIG. 3.

The method 500 may include the following steps.

S501. The terminal device detects a touch operation A performed by a user on a game application, where the touch operation A is used to display a screen of the game application.

The touch operation A may be an operation, for example, dragging, sliding, tap, or double-tap, which is not limited in this embodiment of this application.

S502. The terminal device responds to the touch operation A, the terminal device displays a screen of the game application at a screen refresh rate equal to a frame rate of the game application, and determines whether the screen of the game application is an in-game screen.

After the game application is triggered, the terminal device may obtain the frame rate of the game application, and display the screen of the game application at a screen refresh rate equal to the frame rate of the game application, that is, a current screen refresh rate is equal to the frame rate of the game application.

The in-game screen may be understood as a screen during the game, for example, a battle screen.

For example, the screen of the game application may include a loading screen, a login screen, a game lobby screen, an in-game screen, and the like.

The game application may be developed by using a software development kit (software development kit, SDK), and different names or functions may be set for different screens. When the user uses the game application, the SDK may record the screen name or the function of the game application. The terminal device may perform registration monitoring on the SDK, so as to obtain the screen name or the function of the game application.

For example, the screen name of the game application may include loading, login, a game lobby, in-game, and the like. The terminal device may determine, based on the screen name of the game application, whether the screen of the game application is an in-game screen.

S503. When the screen of the game application is an in-game screen, the terminal device determines whether a touch operation B of the user on the in-game screen is detected.

The touch operation B may be an operation, for example, dragging, sliding, tap, or double-tap, which is not limited in this application.

It should be understood that, when the screen of the game application is not an in-game screen, the terminal device may not perform subsequent steps.

S504. When the touch operation B is detected, the terminal device may determine whether a touch area corresponding to the touch operation B is a target area.

The touch area corresponding to the touch operation B may be a screen coordinate location touched by the user.

The target area may be an area in which a skill icon of the in-game screen is located. It should be understood that the target area is preset.

S505. When the touch area corresponding to the touch operation B is the target area, the terminal device may adjust, based on the frame rate of the game application, the current screen refresh rate to be greater than the frame rate of the game application, so as to obtain an adjusted screen refresh rate.

S506. The terminal device displays the in-game screen at the adjusted screen refresh rate.

The screen refresh rate may usually have an upper limit. For example, the screen refresh rate may be 60 Hz, 90 Hz, or 120 Hz, where 120 Hz is the upper limit of the screen refresh rate. For example, the screen refresh rate may be any integer from 60 Hz to 120 Hz, where 120 Hz is the upper limit of the screen refresh rate.

In this embodiment of this application, when the touch area corresponding to the touch operation B is the target area, the terminal device may obtain the frame rate of the game application; or when the frame rate of the game application is less than the upper limit of the screen refresh rate, the terminal device may adjust the current screen refresh rate to be greater than the frame rate of the game application. For example, when the frame rate of the game application is 60 Hz, and the terminal device may adjust the screen refresh rate to 90 Hz or 120 Hz.

It should be understood that, when the screen refresh rate has an upper limit, the adjusted screen refresh rate is less than or equal to the upper limit of the screen refresh rate. In particular, when the frame rate of the game application is equal to the upper limit of the screen refresh rate, the terminal device may not adjust the current screen refresh rate.

It should be further understood that, when the touch area of the touch operation B is not the target area, the current screen refresh rate is equal to the frame rate of the game application, that is, the terminal device does not perform adjustment.

According to the screen display method provided in this embodiment of this application, an area in which a skill of the in-game screen is located is set to be the target area. When the touch area corresponding to the touch operation of the user is the target area, the current screen refresh rate is adjusted to be greater than the frame rate of the game application, so as to shorten a finger track latency of the game and improve touch experience of the user. In this embodiment of this application, adjustment is performed based on the preset target area of the in-game screen, and a screen refresh rate does not remain constant throughout a game. Therefore, this embodiment of this application strikes a balance between the finger track and the power consumption of the terminal device, thereby improving user experience.

Figure 6:
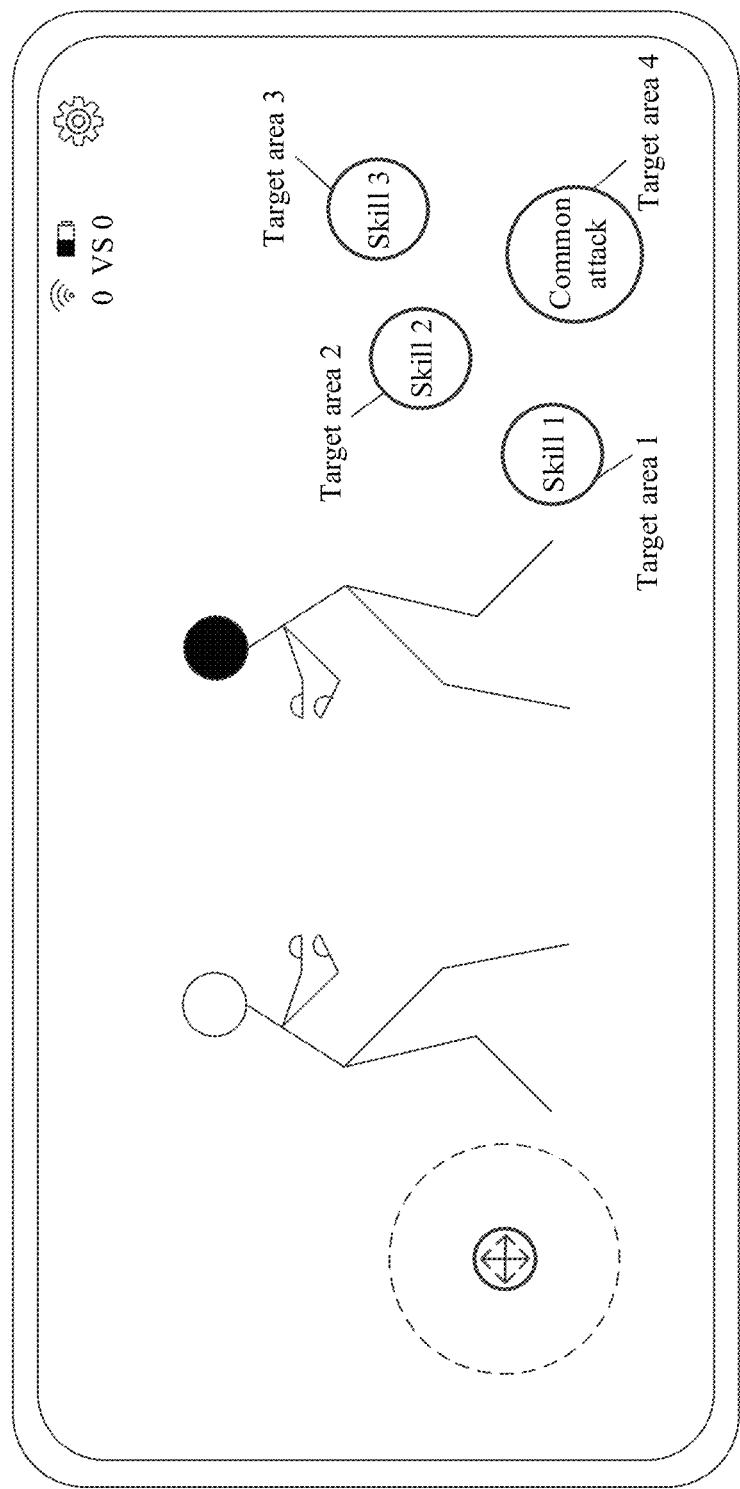
FIG. 6 is a schematic diagram of a location of a target area on a target screen based on a game application according to an embodiment of this application.

A mobile phone is used as an example. FIG. 6 is a schematic diagram of a location of a target area on an in-game screen based on a game application. As shown in FIG. 6, an area in which a skill icon is located is a target area. The skill icons include a skill 1 icon, a skill 2 icon, a skill 3 icon, and a common attack icon. An area corresponding to the skill 1 icon may be a target area 1, an area corresponding to the skill 2 icon may be a target area 2, an area corresponding to the skill 3 icon may be a target area 3, and an area corresponding to the 4 skill icon may be a target area 4. Therefore, the target areas may include the target area 1, the target area 2, the target area 3, and the target area 4.

Coordinates of the target area 1, the target area 2, the target area 3, and the target area 4 on a screen in the game application are pre-recorded. For example, a screen resolution of a terminal device may be 2340*1080. When a user separately taps the skill 1 icon, the skill 2 icon, the skill 3 icon, and the common attack icon, the terminal device may separately obtain coordinates of the skill 1 icon, the skill 2 icon, the skill 3 icon, and the common attack icon on the screen, and separately determine the coordinates of the screen as the coordinates of the target area 1, the target area 2, the target area 3, and the target area 4 on the screen.

Optionally, screen resolutions of different terminal devices may be different. The coordinates of the target area 1, the target area 2, the target area 3, and the target area 4 on the screen in the game application may be relative coordinates. When a screen resolution of another terminal device is different, the another terminal device may determine coordinates of the target area 1, the target area 2, the target area 3, and the target area 4 on the screen based on the relative coordinates.

Optionally, control names corresponding to the skill 1 icon, the skill 2 icon, the skill 3 icon, and the common attack icon may be target names. When detecting a touch operation B of the user, the mobile phone may obtain a name of a control triggered by the user. When the name of the control triggered by the user is the same as the target name, it may be determined that a touch area corresponding to the touch operation B is the target area.

For example, when the touch area corresponding to the touch operation B is any one of the target areas, the terminal device may adjust a current screen refresh rate to be greater than a frame rate of the game application. For example, when the frame rate of the game application is 60 Hz, the terminal device may adjust the current screen refresh rate to 90 Hz or 120 Hz. In another example, when the frame rate of the game application is 90 Hz, the terminal device may adjust the current screen refresh rate to 120 Hz.

In particular, when the frame rate of the game application is 120 Hz, and an upper limit of the screen refresh rate is 120 Hz, the terminal device may not adjust the screen refresh rate.

Figure 7:
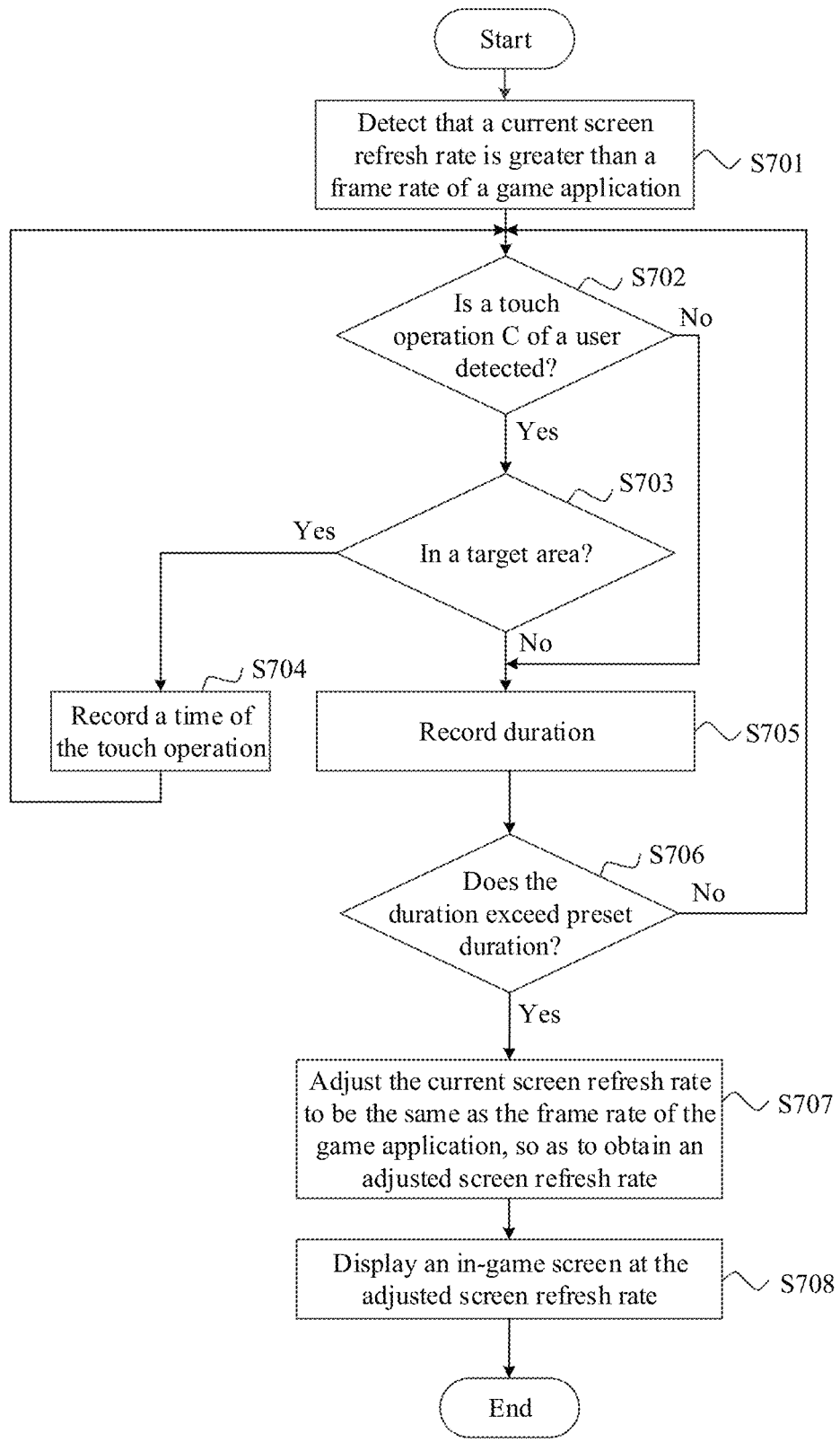
FIG. 7 is a schematic flowchart of another screen display method according to an embodiment of this application.
Figure 8A:
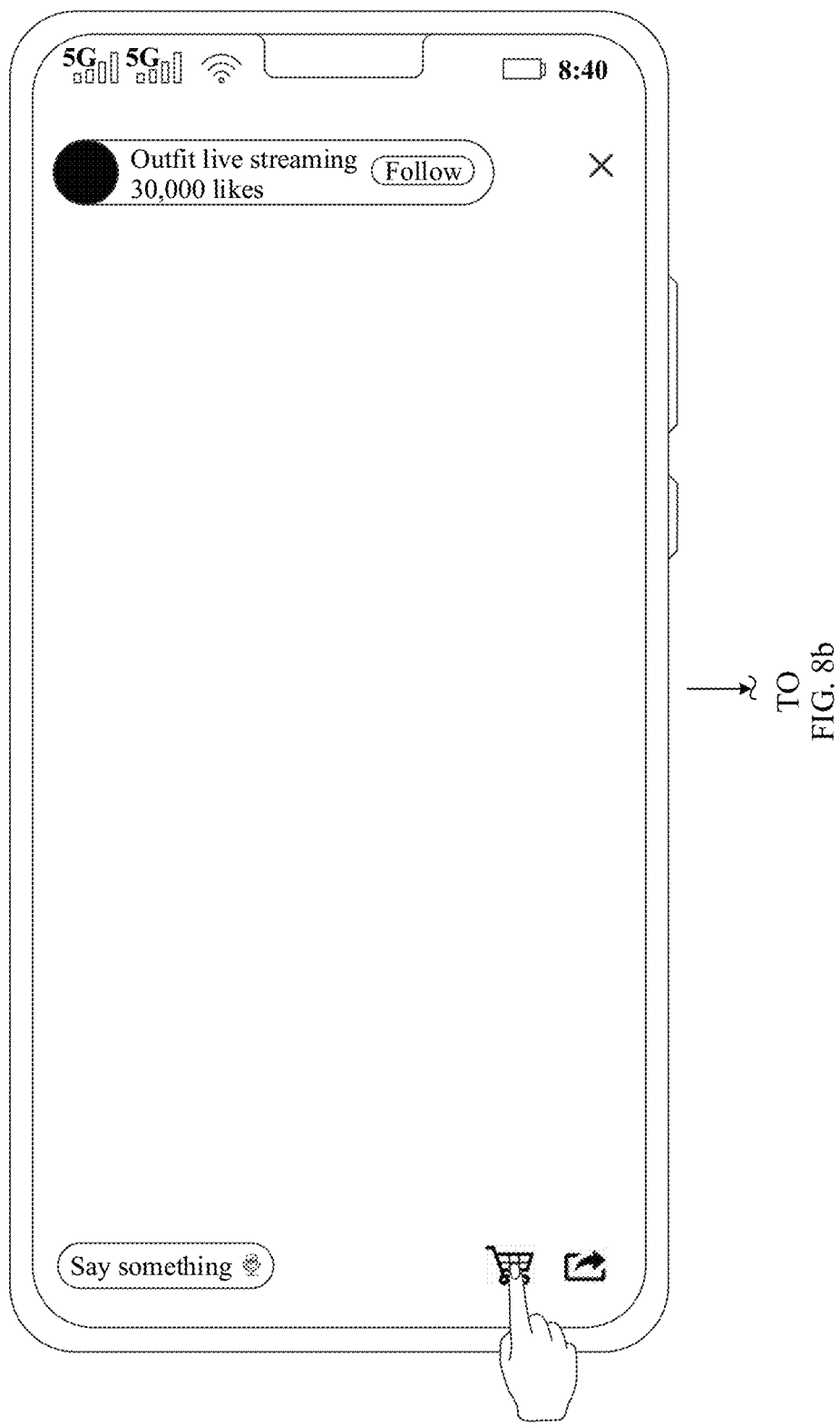
FIG. 8a, FIG. 8b, FIG. 8c, and FIG. 8d are a schematic diagram of a screen of a live streaming flash sale application of a mobile phone.
Figure 8B:
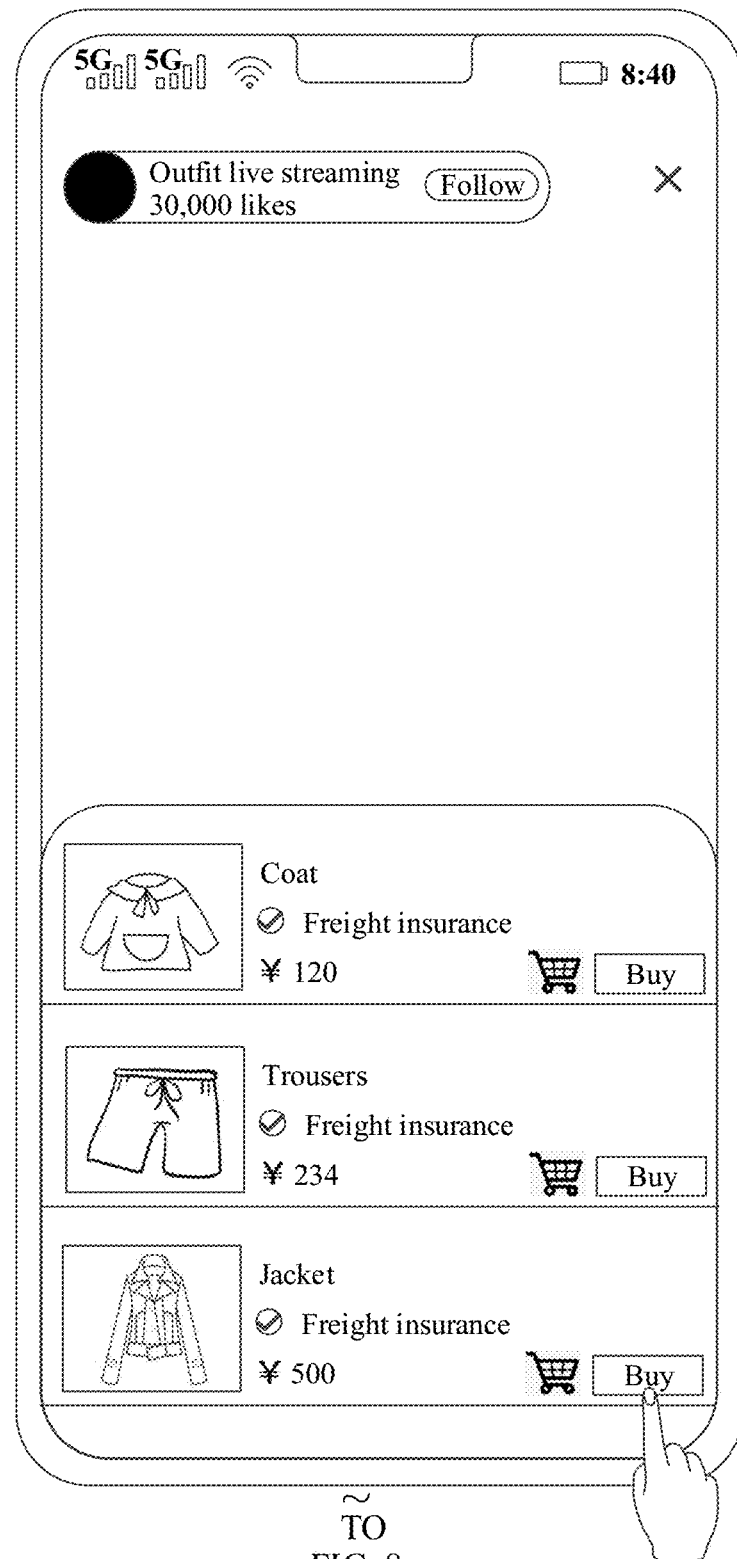
Figure 8C:
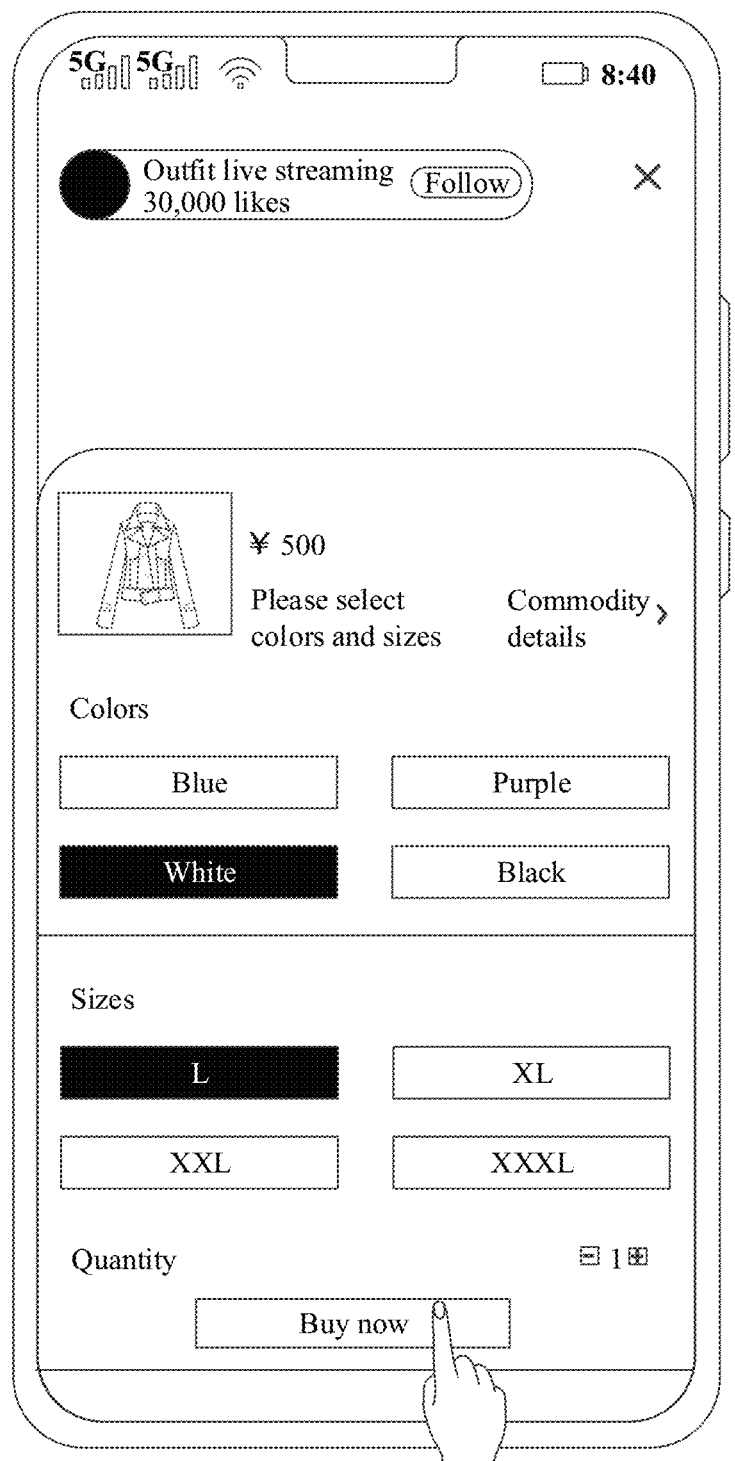
Figure 8D:

In an optional embodiment, as shown in FIG. 7, the method 500 may further include the following steps.

S701. The terminal device detects that the current screen refresh rate is greater than the frame rate of the game application.

It should be understood that the current screen refresh rate is the adjusted screen refresh rate, that is, the current screen refresh rate is greater than the frame rate of the game application.

S702. The terminal device determines whether a touch operation C of the user on the in-game screen is detected.

When the terminal device detects that the user performs the touch operation C on the in-game screen, S703 is performed. When the terminal device does not detect the touch operation C of the user on the in-game screen, S705 is performed and duration is recorded, where the duration is duration in which the user does not perform the touch operation.

For example, the duration may be obtained by subtracting an operation time of the touch operation B from a current time.

S703. When the terminal device detects the touch operation C of the user, the terminal device determines whether a touch area corresponding to the touch operation C is the target area.

When the touch area corresponding to the touch operation C is the target area, the terminal device performs S704. When the touch area corresponding to the touch operation C is not the target area, S705 is performed.

S704. When the touch area corresponding to the touch operation C is the target area, the terminal device records an operation time of the touch operation C.

It should be understood that the operation time of the touch operation C is a time at which the terminal device detects the touch operation C.

For example, the operation time of the touch operation C may be recorded as startCheckTime.

After the terminal device records the operation time of the touch operation C, S702 may be continually performed.

S705. When the touch area corresponding to the touch operation C is not the target area, the terminal device records duration.

It should be understood that the duration is duration in which the touch area corresponding to the touch operation of the user is not the target area.

For example, the duration may be recorded as duration. The duration may be obtained by subtracting the operation time of the touch operation C from a current time, that is, may be represented as duration=now-startCheckTime.

S706. The terminal device determines whether the duration exceeds preset duration.

The preset duration may be 1s, 3s, 5s, or the like. The preset duration may be preset when a developer develops the terminal device.

For example, the developer may collect power consumption corresponding to different preset duration and the user's game experience corresponding to different preset duration, to determine the preset duration based on the power consumption corresponding to different preset duration and the user's game experience corresponding to different preset duration.

When the duration exceeds the preset duration, the terminal device may perform S707. When the duration does not exceed the preset duration, the terminal device may perform S702.

S707. When the duration exceeds the preset duration, the terminal device may adjust the current screen refresh rate to be equal to the frame rate of the game application, so as to obtain an adjusted screen refresh rate.

When the duration exceeds the preset duration, that is, within the preset duration, the touch operation C of the user is not detected, or the touch operation C of the user is detected but the touch area corresponding to the touch operation C is not the target area, the terminal device may adjust the current screen refresh rate to be equal to the frame rate of the game application.

S708. The terminal device displays the in-game screen at the adjusted screen refresh rate.

Optionally, after S708, the terminal device may further continue to detect a touch operation D of the user. When it is detected that a touch area corresponding to the touch operation D of the user is the target area, the adjusted screen refresh rate (the adjusted screen refresh rate is equal to the frame rate of the game application) may be re-adjusted to be greater than the frame rate of the game application.

According to the screen display method provided in this embodiment of this application, when the current screen refresh rate is greater than the frame rate of the game application, the preset duration is set. When the touch operation C of the user is not detected within the preset duration, or the touch operation C of the user is detected but the touch area corresponding to the touch operation C is not the target area, the current screen refresh rate may be adjusted to be equal to the frame rate of the game application. That is, the terminal device does not need to display the in-game screen always at the screen refresh rate greater than the frame rate of the game application. When the foregoing conditions are met, the in-game screen may be displayed at the refresh rate equal to the frame rate of the game application. The screen refresh rate is dynamically adjusted to strike a balance between finger track and power consumption of the terminal device, ensure picture smoothness, and improve user experience.

In an optional embodiment, the target area may be a preset area of the terminal device. The terminal device may preset a location of each game skill on the screen, and determine an area in which a game skill icon is located as the target area. The terminal device may further determine, based on the location of each game skill on the screen, areas in which game skill icons of most games are located, and determine the areas in which game skill icons of most games are located as the target area.

Optionally, the target area may alternatively be changed based on a touch operation of the user. For example, the terminal device may collect touch operations of the user for a time period, record touch areas corresponding to the touch operations of the user, and determine a touch area with most touches in the time period as the target area.

According to the screen display method provided in this embodiment of this application, the target area may be determined based on the touch operation of the user, and the target area may be flexibly changed, to further flexibly adjust timing of increasing the screen refresh rate, thereby improving user experience.

It should be understood that a method used by the terminal device to determine whether the touch operation of the user is detected is to detect whether a composite frame function is invoked. In an optional embodiment, when the current screen refresh rate is greater than the frame rate of the game application, and within the preset duration, the terminal device does not detect that the composite frame function (for example, SurfaceFlinger) is invoked, the terminal device may adjust the current screen refresh rate to be equal to the frame rate of the game application.

When the terminal device detects the touch operation of the user (the touch operation may be any one of the foregoing touch operations), the composite frame function needs to be invoked in response to the touch operation. When the current screen refresh rate is greater than the frame rate of the game application, and within the preset duration, the terminal device does not detect that the composite frame function is invoked, that is, does not detect the touch operation of the user, the terminal device may adjust the current screen refresh rate to be equal to the frame rate of the game application.

All the foregoing screen display methods are described by using the game scenario as an example. The screen display method provided in this embodiment of this application is further applicable to a live streaming flash sale scenario.

FIG. 8 is a schematic diagram of a screen of a live streaming flash sale application of a mobile phone. As shown on screen a in FIG. 8, a user may tap a shopping cart icon in the lower right corner for buying. It should be understood that the user may further tap a sharing icon to share this outfit live streaming with a friend. The user may also enter text in a "say something" text control to communicate with an outfit streamer, or tap a microphone icon to communicate with the outfit streamer. The user may also tap a close icon in the upper right corner to turn off the outfit live streaming. The user may also tap a follow icon to follow the outfit live streaming.

When the terminal device detects that the user triggers a control corresponding to the shopping cart icon, screen b in FIG. 8 may be displayed. As shown on the screen b in FIG. 8, the user may see information such as pictures of clothes such as a coat, a pair of trousers, and a jacket, prices of the clothes such as the coat, the pair of trousers, and the jacket (120, 234, and 500 respectively), and whether freight insurance is included for the clothes such as the coat, the pair of trousers, and the jacket. The user may tap buy options corresponding to the clothes such as the coat, the pair of trousers, and the jacket to buy the clothes. It should be understood that types and quantities of the clothes are not limited in this embodiment of this application.

When the terminal device detects that the user triggers a control corresponding to the buy option corresponding to the jacket, screen c in FIG. 8 may be displayed. As shown on the screen c in FIG. 8, the user may select a color and a size of the jacket. Colors include blue, purple, white, and black. Sizes include L, XL, XXL, and XXXL. The user may also select a quantity to be bought. A default value of the quantity to be bought is 1. The user may tap a plus option to increase the quantity to be bought, or tap a minus option to reduce the quantity to be bought. The color of the jacket selected by the user is white, and a selected size is L. After selecting the color and the size of the jacket, the user may tap a buy now option to buy the jacket.

When the terminal device detects that the user triggers a control corresponding to the buy now option, screen d in FIG. 8 may be displayed. As shown in the screen d in FIG. 8, the user's name is "Zhang San", a mobile phone number is 183****4567, an address is * Building ** Community, Chengdu, Sichuan Province, the price is 500, payment by a bank card is selected. The user may tap a submit order option to make payment.

In the live streaming flash sale scenario shown in FIG. 8, a target area may be set. When a touch area corresponding to a touch operation of the user is the target area, a screen refresh rate may be adjusted to be greater than a frame rate of the live streaming application, so as to shorten a finger track latency of the live streaming flash sale, and improve touch experience of the user. When the touch area corresponding to the touch operation of the user is not the target area, the screen refresh rate may be re-adjusted to be equal to the frame rate of the live streaming application, so as to reduce power consumption. This strikes a balance between finger track and power consumption of the terminal device, thereby improving user experience.

Figure 9:
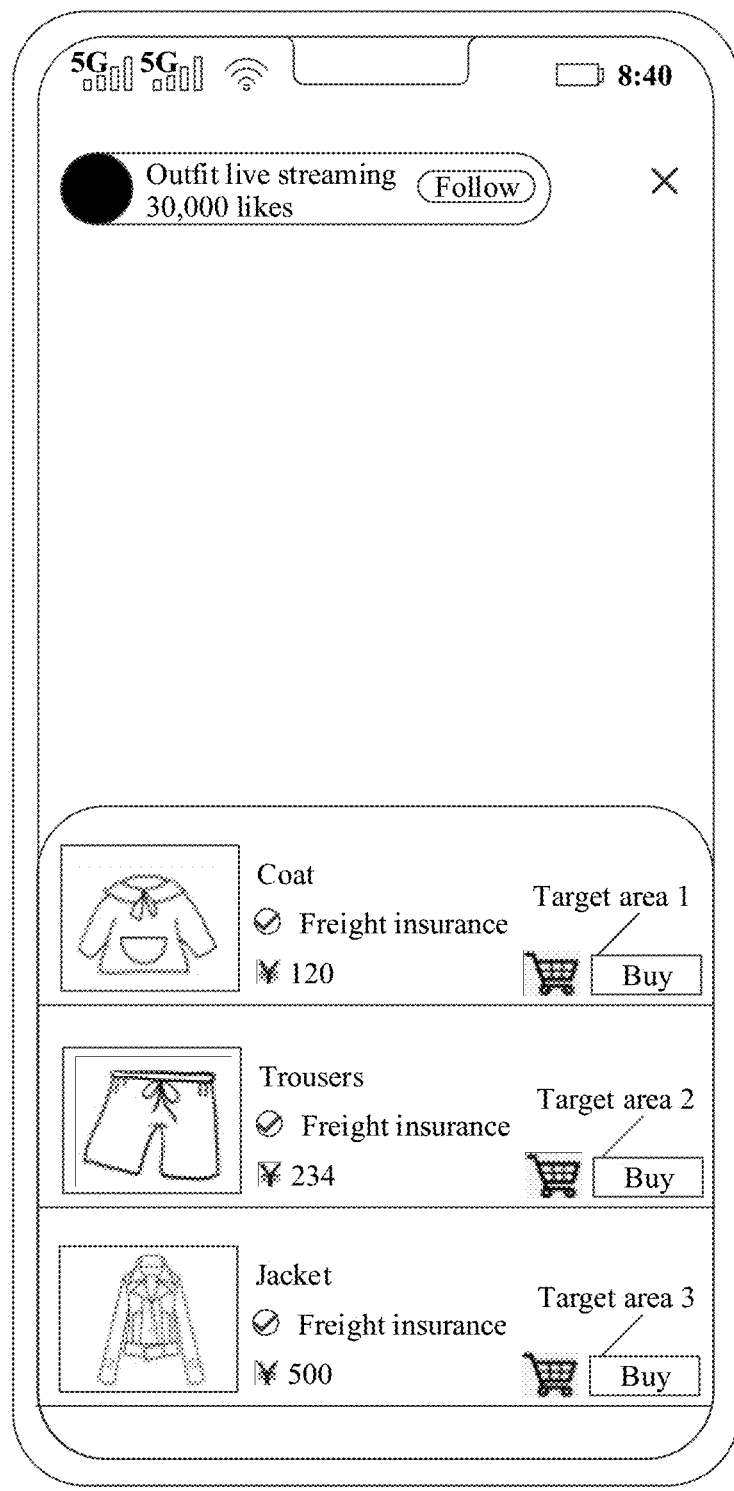
FIG. 9 is a schematic diagram of a location of a target area on a target screen based on a live streaming flash sale application according to an embodiment of this application.

For example, on the screen b in FIG. 8, the terminal device may set, as the target area, an area in which the buy option corresponding to each of the clothes such as the coat, the pair of trousers, and the jacket is located. As shown in FIG. 9, the terminal device may set the area in which the buy option corresponding to the coat is located to be a target area 1, the area in which the buy option corresponding to the pair of trousers is located to be a target area 2, and the area in which the buy option corresponding to the jacket is located to be a target area 3.

Figure 10:
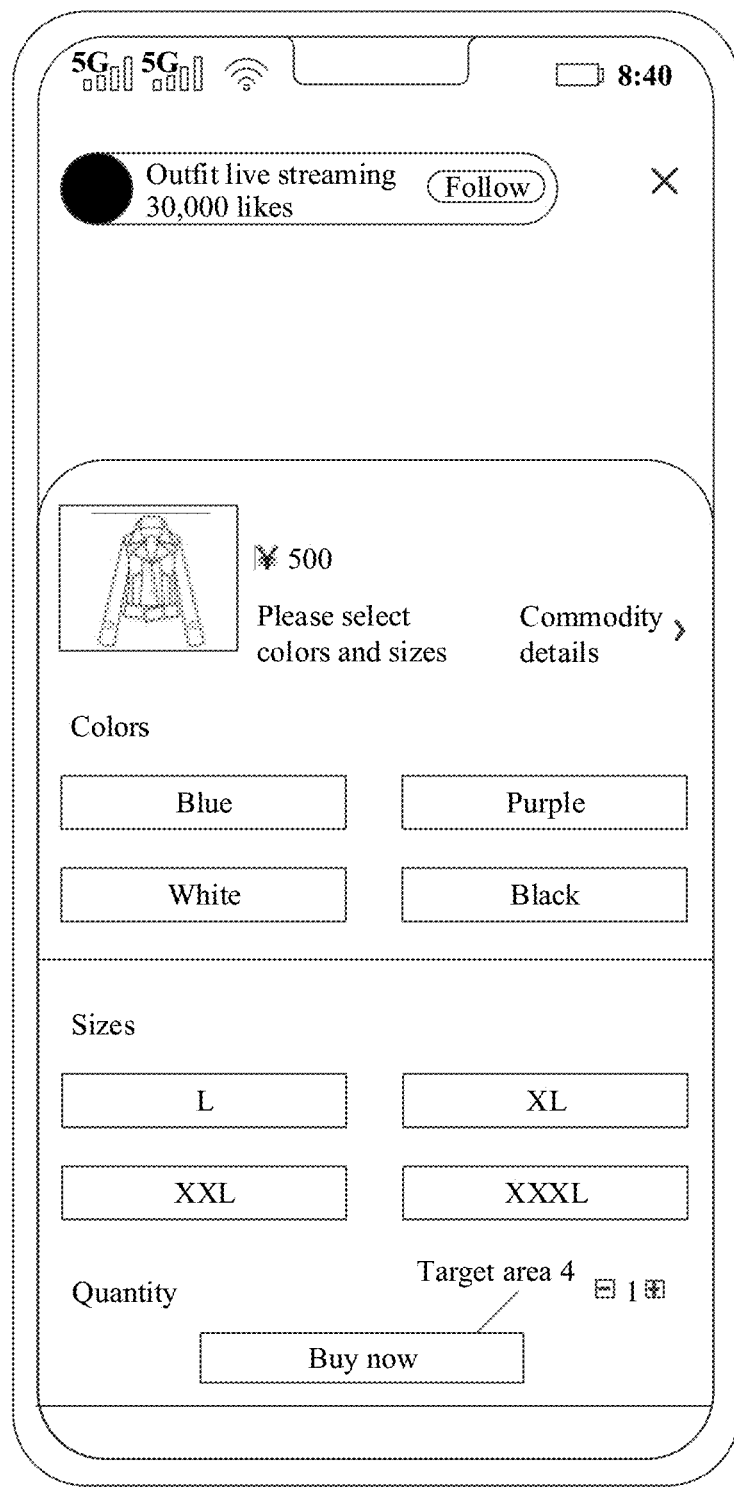
FIG. 10 is a schematic diagram of a location of another target area on a target screen based on a live streaming flash sale application according to an embodiment of this application.

On the screen c in FIG. 8, the terminal device may further set an area in which the buy now option is located to be the target area. As shown in FIG. 10, the terminal device may set the area in which the buy now option is located to be a target area 4.

Figure 11:
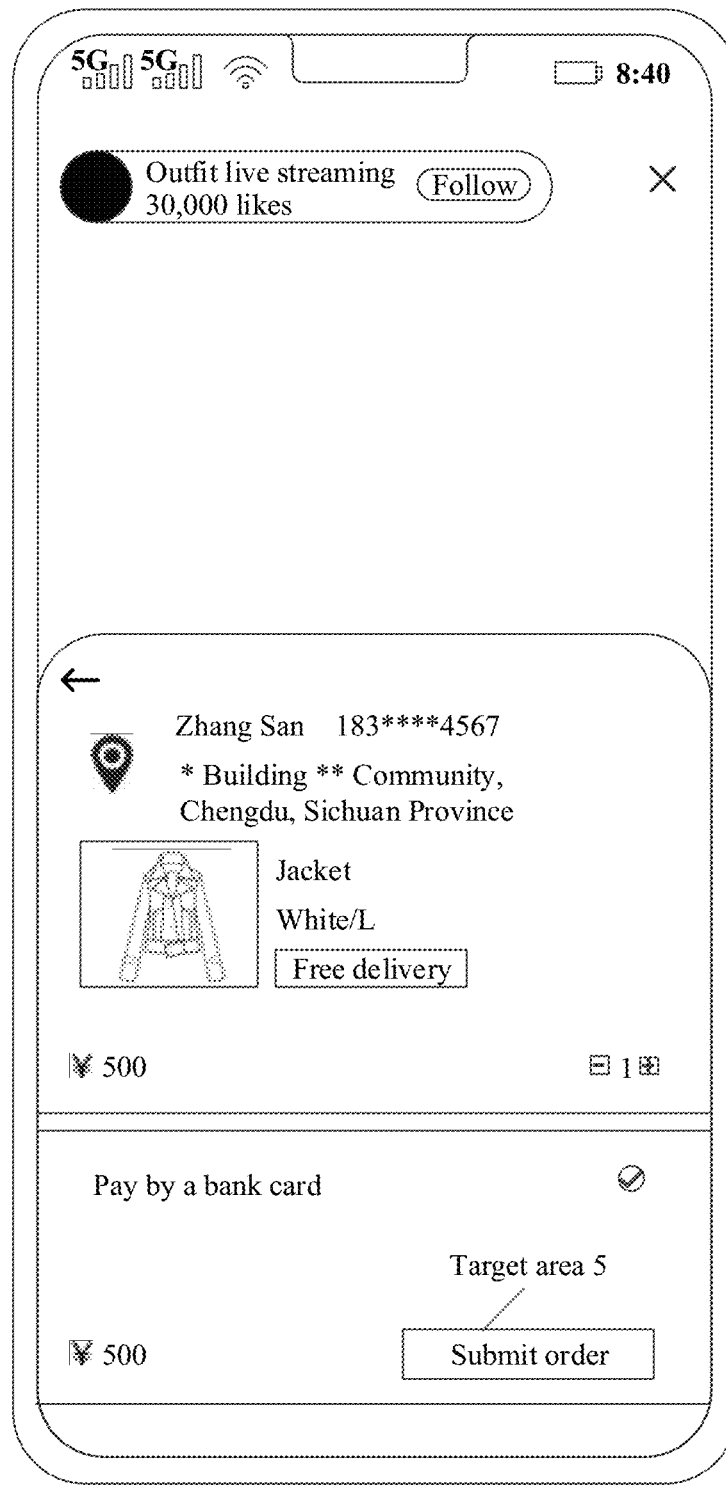
FIG. 11 is a schematic diagram of a location of still another target area on a target screen based on a live streaming flash sale application according to an embodiment of this application.

On the screen d in FIG. 8, the terminal device may further set an area in which the submit order option is located to be the target area. As shown in FIG. 11, the terminal device may set the area in which the submit order option is located to be a target area 5.

The live streaming application may be developed by using a software development kit (software development kit, SDK). When the user uses the live streaming application, the SDK may record a screen name or a function of the live streaming application. The terminal device may perform registration monitoring on the SDK, so as to obtain the name or the function of the live streaming application.

For example, in FIG. 8, the screen a in FIG. 8 may be a shopping screen, the screen b in FIG. 8 may be a flash sale screen, the screen c in FIG. 8 may be a buy screen, and the screen d in FIG. 8 may be a submit order screen.

When the terminal device detects the touch operation of the user on the live streaming application, and detects, by performing registration monitoring on the SDK, that a screen name is the flash sale screen, the terminal device may obtain the frame rate of the live streaming application, and adjust the screen refresh rate to be equal to the frame rate of the live streaming application, so as to ensure picture smoothness.

When the terminal device detects a touch operation of the user on the flash sale screen, and a touch area corresponding to the touch operation is the target area, that is, the area corresponding to the touch operation is the target area 1, the target area 2, or the target area 3, the terminal device may adjust the screen refresh rate to be greater than the frame rate of the live streaming application, so as to shorten a finger track latency of the live streaming flash sale, and improve touch experience of the user.

After the terminal device adjusts the screen refresh rate to be greater than the frame rate of the live streaming application, when the terminal device does not detect a touch operation of the user within preset duration, or detects that there is a touch operation but a touch area corresponding to the touch operation is not the target area, or does not detect that a composite frame function is invoked, the terminal device may re-adjust the screen refresh rate to be equal to the frame rate of the live streaming application. That is, the terminal device does not need to display the flash sale screen always at the screen refresh rate greater than the frame rate of the live streaming application. The screen refresh rate can be dynamically adjusted to strike a balance between finger track and power consumption of the terminal device, ensure picture smoothness, and improve user experience.

After the terminal device adjusts the screen refresh rate to be equal to the frame rate of the live streaming application, when the terminal device detects a touch operation of the user, and a touch area corresponding to the touch operation is the target area, the terminal device may re-adjust the screen refresh rate to be greater than the frame rate of the live streaming application, so as to shorten a finger track latency of the live streaming flash sale, and improve touch experience of the user.

It should be understood that, for the buy screen and the submit order screen of the live streaming application, a screen display method is similar to the screen display method for the flash sale screen. Details are not described herein again.

The screen display method provided in this embodiment of this application is applicable to the foregoing terminal device with a display, and is also applicable to a terminal device that implements an operation on an application by using a mouse or a pointer controlled by a touchpad, for example, a notebook computer.

Figures 12A, 12B:
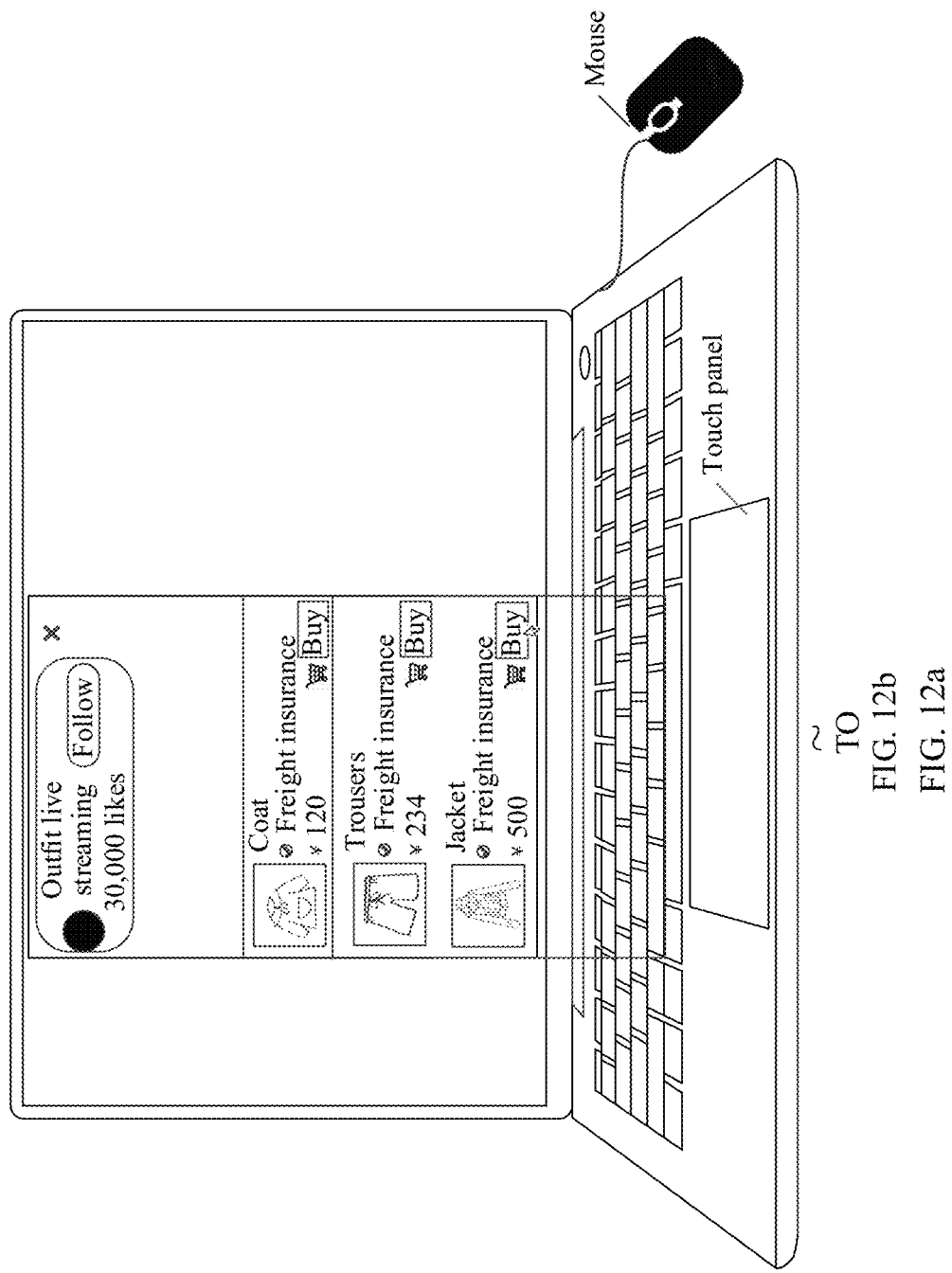
FIG. 12*a* and FIG. 12*b* are a schematic diagram of a screen of a live streaming flash sale application based on a notebook computer.
Figure 12B:
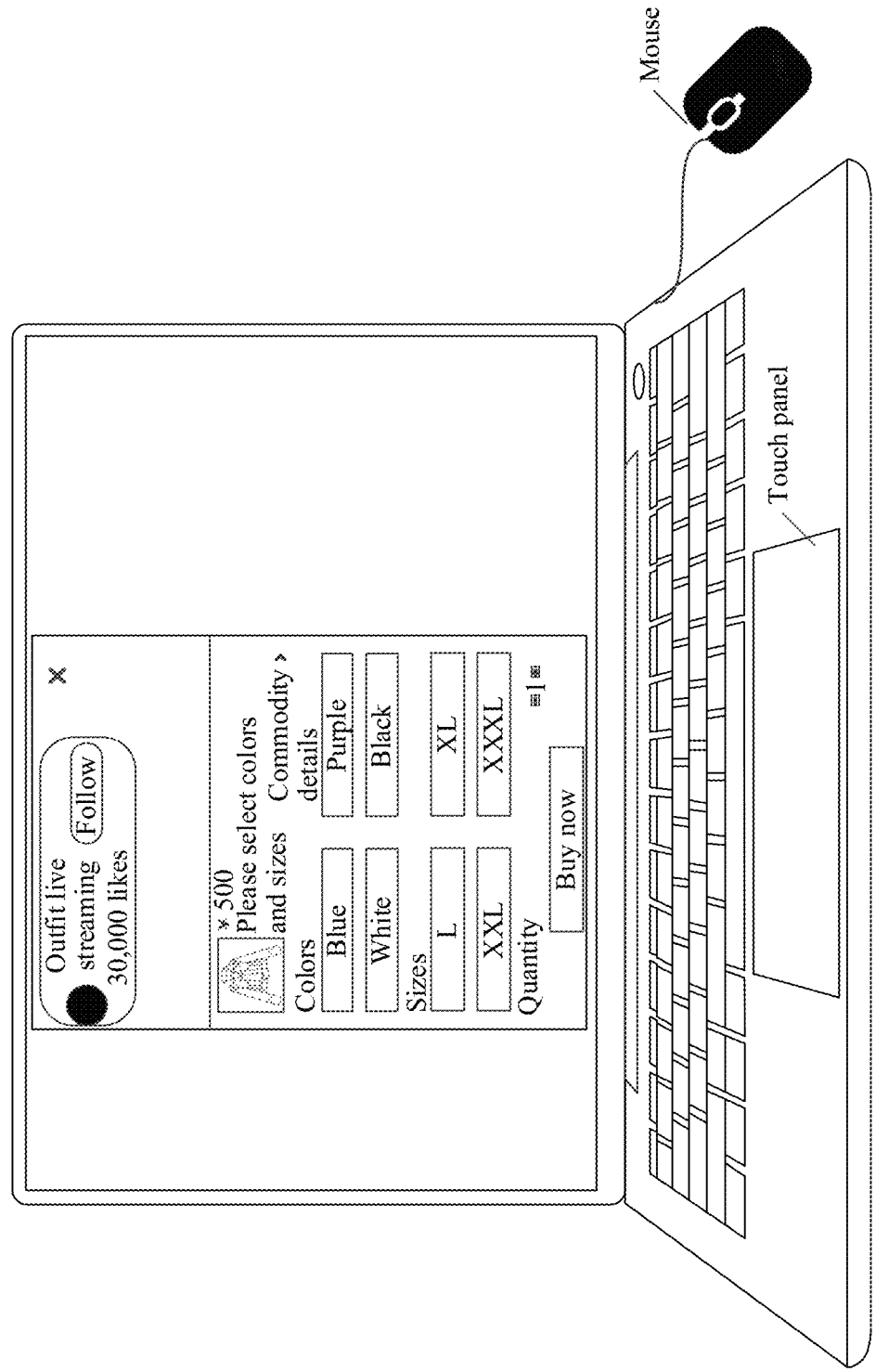

For example, FIG. 12 is a schematic diagram of a screen of a live streaming flash sale of a notebook computer. The notebook computer may implement an operation on a live streaming application by using a mouse or a pointer controlled by a touchpad. As shown on screen a in FIG. 12, a user may tap buy options corresponding to clothes such as a coat, a pair of trousers, and a jacket by using the mouse or the pointer controlled by a touchpad. When the terminal device detects that the user triggers a control corresponding to the buy option corresponding to the jacket, screen b in FIG. 12 may be displayed. As shown on the screen b in FIG. 12, the user may select a color and a size of the jacket.

The terminal device may display the screen and the screen b in FIG. 12 at a screen refresh rate equal to a frame rate of the live streaming application, that is, a current screen refresh rate is equal to the frame rate of the live streaming application.

On the screen a in FIG. 12, the buy option corresponding to the jacket may be a preset target area. When detecting that the user triggers the control corresponding to the buy option corresponding to the jacket, the notebook computer may adjust the current screen refresh rate to be greater than the frame rate of the live streaming application. This improves the screen refresh rate, shortens display latency, and improves user experience. In this embodiment of this application, adjustment is performed based on the preset target area of the flash sale screen, and the screen refresh rate does not remain constant in the entire live streaming application. Therefore, this embodiment of this application strikes a balance between the finger track and the power consumption of the terminal device, thereby improving user experience.

Figure 13:
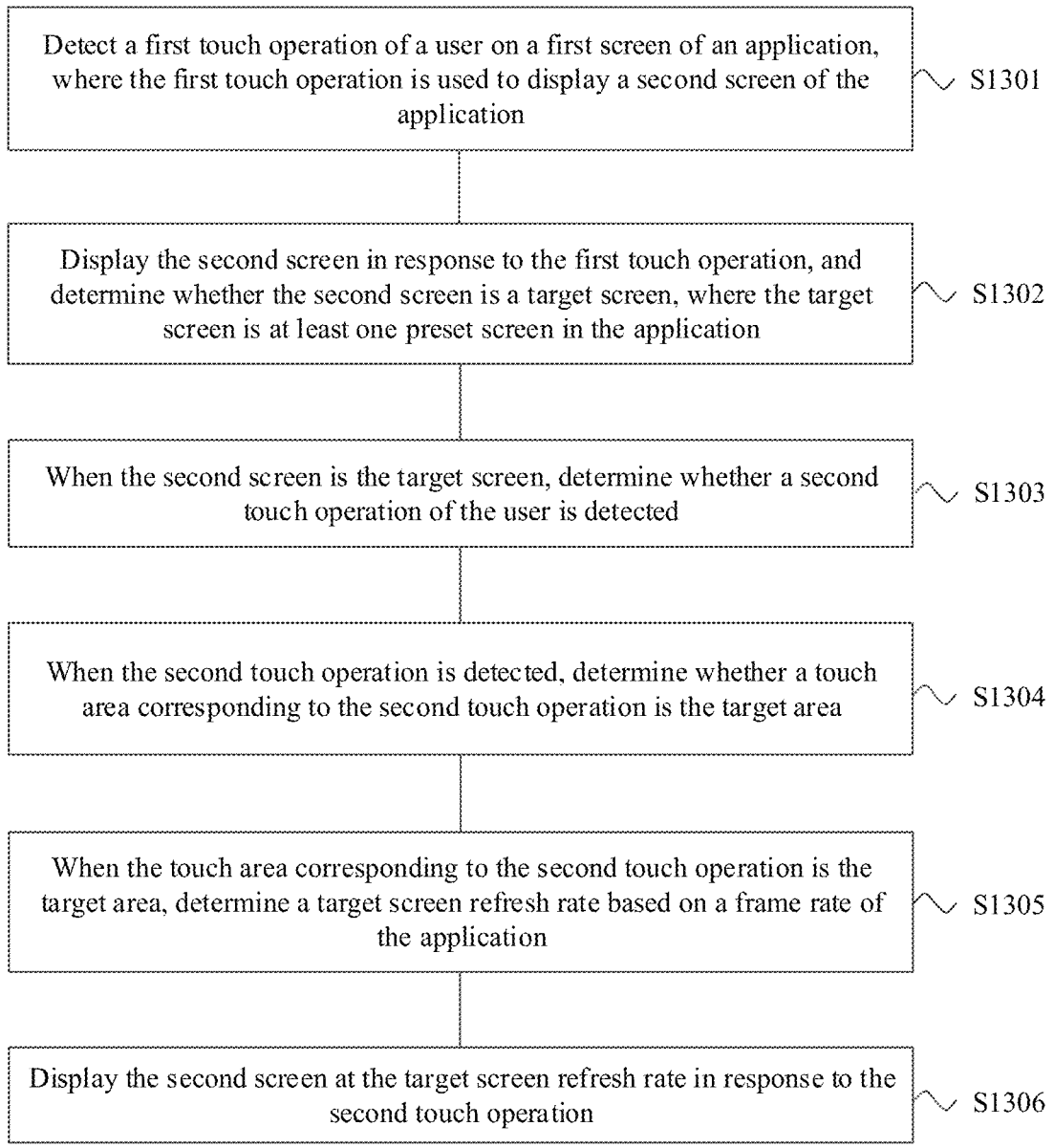
FIG. 13 is a schematic flowchart of still another screen display method according to an embodiment of this application.

FIG. 13 is a schematic flowchart of another screen display method 1300. The method may be applied to a terminal device with a touch panel. The method 1300 may include the following steps.

S1301. The terminal device detects a first touch operation of a user on a first screen of an application, where the first touch operation is used to display a second screen of the application.

For example, the application may be the game application or the live streaming application, and the first screen may be the shopping screen of the live streaming application. The second screen may be the in-game screen of the game application, the flash sale screen of the live streaming application, the buy screen of the live streaming application, the submit order screen of the live streaming application, or the like.

S1302. The terminal device displays the second screen at a screen refresh rate equal to a frame rate of the application in response to the first touch operation, and determines whether the second screen is a target screen, where the target screen is at least one preset screen in the application.

The target screen may be any screen provided with a target area, may be an in-game screen of the game application, or may be the flash sale screen, the buy screen, or the submit order screen of the live streaming application. It should be understood that this embodiment of this application is not limited thereto.

The terminal device may obtain the frame rate of the application, then adjust the screen refresh rate to be equal to the frame rate of the application, and display the second screen at the screen refresh rate.

S1303. When the second screen is the target screen, the terminal device determines whether a second touch operation of the user on the second screen is detected.

S1304. When the second touch operation is detected, the terminal device determines whether a touch area corresponding to the second touch operation is the target area, where the target area is at least one preset area on the target screen.

For a method for setting the target area, refer to a method for setting the target areas of the in-game screen and the flash sale screen of the live streaming application. Details are not described herein again.

For a method for determining whether the touch area corresponding to the second touch operation is the target area, refer to that for the in-game screen. Details are not described herein again.

Optionally, the terminal device may further record an operation time of the second touch operation.

S1305. When the touch area corresponding to the second touch operation is the target area, the terminal device determines a target screen refresh rate based on the frame rate of the application, where the target screen refresh rate is greater than or equal to the frame rate of the application.

The target refresh rate may be the adjusted screen refresh rate in the method 500 in the foregoing embodiment.

S1306. Display the second screen at the target screen refresh rate in response to the second touch operation.

It should be understood that the method 1300 is also applicable to a terminal device that implements an operation on an application by using a mouse or a pointer controlled by a touchpad.

According to the screen display method provided in this embodiment of this application, the screen provided with a target area is set as the target screen; and on the target screen, when the touch area corresponding to the touch operation of the user is the target area, the screen refresh rate is adjusted to be greater than the frame rate of the application, so as to shorten a finger track latency of the game, and improve touch experience of the user. In this embodiment of this application, adjustment is performed based on a preset target area of the target screen, and the screen refresh rate does not remain constant in the entire application. Therefore, this embodiment of this application strikes a balance between the finger track and the power consumption of the terminal device, thereby improving user experience.

In an optional embodiment, when the target screen refresh rate is greater than the frame rate of the application, the terminal device determines whether a third touch operation of the user on the second screen is detected, and may adjust the target screen refresh rate based on a detection status of the third touch operation.

According to the screen display method provided in this embodiment of this application, when the target screen refresh rate is greater than the frame rate of the application, the terminal device may adjust the target screen refresh rate based on the detection status of the third touch operation, so as to dynamically adjust the screen refresh rate, strike a balance between finger track and power consumption of the terminal device, ensure picture smoothness, and improve user experience.

Optionally, when the third touch operation is not detected, the terminal device may record, based on a target time, duration of a touch operation corresponding to the target time; or when the duration is greater than or equal to preset duration, the terminal device may adjust the target screen refresh rate to be equal to the frame rate of the application.

Optionally, when the third touch operation is detected, the terminal device may determine whether a touch area corresponding to the third touch operation is the target area. When the touch area corresponding to the third touch operation is not the target area, the terminal device may record a current time, make a difference between the current time and a target time (for example, the touch time of the second touch operation), and record duration after the target time (the second touch operation); or when the duration is greater than or equal to a preset duration, the screen refresh rate is adjusted to be equal to the frame rate of the application.

The target time is used to indicate an operation time of a touch operation that is the target area. If the terminal device detects the third touch operation, and the touch area corresponding to the third touch operation is the target area, the terminal device may record an operation time of the third touch operation, and update the foregoing target time.

According to the screen display method provided in this embodiment of this application, when the target screen refresh rate is greater than the frame rate of the application, and within the preset duration, when the terminal device does not detect a touch operation of the user, or detects that there is a touch operation of the user but a touch area corresponding to the touch operation is not the target area, the target screen refresh rate is adjusted to be equal to the frame rate of the application. That is, the terminal device does not need to display the second screen always at the target screen refresh rate greater than the frame rate of the application. When the foregoing conditions are met, the second screen may be displayed at the target screen refresh rate equal to the frame rate of the application. The screen refresh rate can be dynamically adjusted to strike a balance between finger track and power consumption of the terminal device, ensure picture smoothness, and improve user experience.

The foregoing describes in detail the screen display methods in the embodiments of this application with reference to FIG. 1 to FIG. 13. The following describes in detail the terminal devices in the embodiments of this application with reference to FIG. 14 and FIG. 15.

Figure 14:
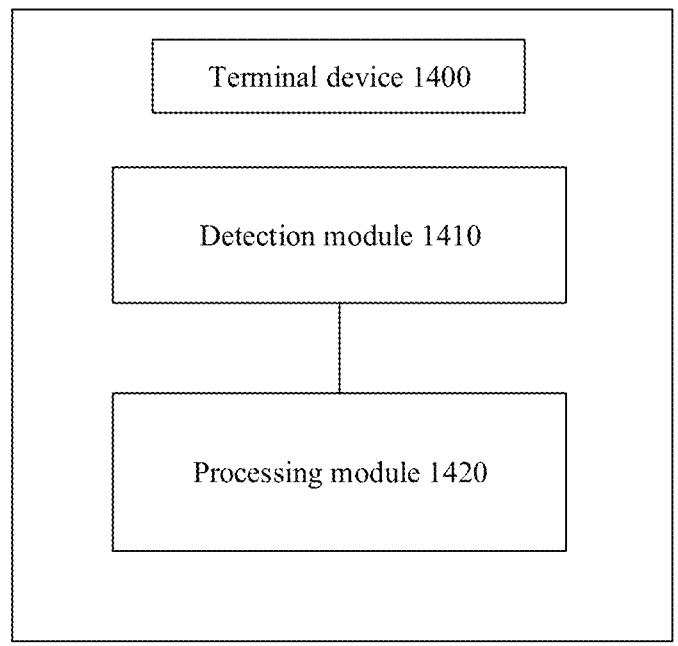
FIG. 14 is a schematic block diagram of a terminal device according to an embodiment of this application.

FIG. 14 is a schematic diagram of a terminal device 1400 according to an embodiment of this application. The terminal device 1400 includes a detection module 1410 and a processing module 1420. The detection module 1410 is configured to detect a first touch operation of a user on a first screen of an application, where the first touch operation is used to display a second screen of the application. The processing module 1420 is configured to: display the second screen at a screen refresh rate equal to a frame rate of the application in response to the first touch operation, and determine whether the second screen is a target screen, where the target screen is at least one preset screen in the application; when the second screen is the target screen, determine whether a second touch operation of the user on the second screen is detected; when the second touch operation is detected, determine whether a touch area corresponding to the second touch operation is a target area, where the target area is at least one preset area on the target screen; when the touch area corresponding to the second touch operation is the target area, determine a target screen refresh rate based on the frame rate of the application, where the target screen refresh rate is greater than or equal to the frame rate of the application; and display the second screen at the target screen refresh rate in response to the second touch operation.

Optionally, when the frame rate of the application is equal to an upper limit of the screen refresh rate, the target screen refresh rate is equal to the frame rate of the application; or when the frame rate of the application is less than the upper limit of the screen refresh rate, the target screen refresh rate is greater than the frame rate of the application, and is less than or equal to the upper limit of the screen refresh rate.

Optionally, the target screen refresh rate is greater than the frame rate of the application; and the processing module 1420 is further configured to determine whether a third screen touch operation of the user on the second screen is detected, and adjust the target screen refresh rate based on a detection status of the third touch operation.

Optionally, the processing module 1420 is further configured to: record an operation time of the second touch operation, and determine the operation time of the second touch operation as a target time; if the third touch operation is not detected, record, based on the target time, duration of a touch operation corresponding to the target time; and when the duration is greater than or equal to preset duration, adjust the target screen refresh rate to be equal to the frame rate of the application.

Optionally, the processing module 1420 is further configured to: if the third touch operation is detected, determine whether a touch area corresponding to the third touch operation is the target area; when the touch area corresponding to the third touch operation is not the target area, record, based on the target time, duration of a touch operation corresponding to the target time; and when the duration is greater than or equal to the preset duration, adjust the target screen refresh rate to be equal to the frame rate of the application.

Optionally, the processing module 1420 is further configured to: when the touch area corresponding to the third touch operation is the target area, record an operation time of the third touch operation, and update the target time to the operation time of the third touch operation.

Optionally, the application is a game application, the target screen is a battle screen, and the target area is an area in which a skill icon is located in the battle screen.

It should be understood that the terminal device 1400 herein is embodied in a form of a functional module. The term "module" herein may refer to an application specific integrated circuit (application specific integrated circuit, ASIC), an electronic circuit, a processor configured to execute one or more software or firmware programs (such as a shared processor, a dedicated processor, or a group processor), a memory, a combined logic circuit, and/or any other suitable component that supports the described function. In an optional example, a person skilled in the art may understand that the terminal device 1400 may be specifically the terminal device in the method embodiments, or the function of the terminal device in the method embodiments may be integrated into the terminal device 1400. The terminal device 1400 may be configured to execute processes and/or steps corresponding to the terminal device in the method embodiments. To avoid repetition, details are not described herein again.

The terminal device 1400 has a function of implementing corresponding steps performed by the terminal device in the method embodiments. The functions may be implemented by using hardware, or may be implemented by corresponding software executed by hardware. The hardware or software includes one or more modules corresponding to the foregoing function.

In this embodiment of this application, the terminal device 1400 in FIG. 14 may alternatively be a chip or a chip system, for example, a system on chip (system on chip, SoC).

Figure 15:
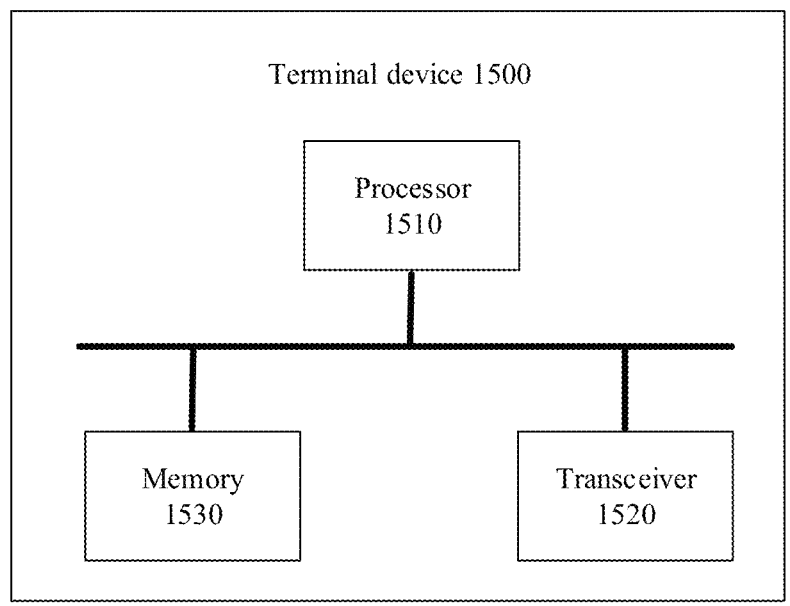
FIG. 15 is a schematic block diagram of another terminal device according to an embodiment of this application.

FIG. 15 is a schematic block diagram of another terminal device 1500 according to an embodiment of this application. The terminal device 1500 includes a processor 1510, a transceiver 1520, and a memory 1530. The processor 1510, the transceiver 1520, and the memory 1530 communicate with each other through an internal connection path. The memory 1530 is configured to store instructions. The processor 2140 is configured to execute the instructions stored in the memory 1530, so as to control the transceiver 1520 to send a signal and/or receive a signal.

It should be understood that the terminal device 1500 may be specifically the terminal device in the method embodiments, or the function of the terminal device in the method embodiments may be integrated into the terminal device 1500. The terminal device 1500 may be configured to perform steps and/or processes corresponding to the terminal device in the method embodiments. Optionally, the memory 1530 may include a read-only memory and a random access memory, and provides instructions and data to the processor. A part of the memory may further include a non-volatile random access memory. For example, the memory may further store information about a device type. The processor 1510 may be configured to execute the instructions stored in the memory. Further, when the processor executes the instructions, the processor may perform steps and/or processes corresponding to the terminal device in the method embodiments.

It should be understood that, in this embodiment of this application, the processor 1510 may be a central processing unit (central processing unit, CPU). Alternatively, the processor may be another general-purpose processor, a digital signal processor (DSP), an application specific integrated circuit (ASIC), a field-programmable gate array (FPGA), another programmable logic device, a discrete gate, a transistor logic device, a discrete hardware component, or the like. The general-purpose processor may be a microprocessor, or the processor may be any conventional processor.

During implementation, the steps of the method may be performed by using an integrated logic circuit of hardware in the processor or by using instructions in a form of software. The steps of the method disclosed by the embodiments of this application may be directly performed by a hardware processor, or by a combination of hardware in a processor and a software module. The software module may be located in a mature storage medium in the art, for example, a random access memory, a flash memory, a read-only memory, a programmable read-only memory, an electrically erasable programmable memory, or a register. The storage medium is located in the memory. The processor executes the instructions in the memory, and performs the steps in the method together with hardware in the processor. To avoid repetition, details are not described herein again.

This application further provides a computer-readable storage medium. The computer-readable storage medium is used to store a computer program, and the computer program is used to implement the method corresponding to the terminal device in the method embodiments.

This application further provides a chip system, and the chip system is configured to support the terminal device in the method embodiments in implementing the functions shown in the embodiments of this application.

This application further provides a computer program product, and the computer program product includes a computer program (which may also be referred to as code or instructions). When the computer program runs on a computer, the computer may perform the method corresponding to the terminal device shown in the method embodiments.

A person of ordinary skill in the art may be aware that units and algorithm steps in examples described with reference to the embodiments disclosed in this specification can be implemented as electronic hardware or a combination of computer software and electronic hardware. Whether these functions are implemented by using hardware or software depends on specific application of the technical solution and design constraints. A person skilled in the art may use different methods to implement the described functions for each specific application, but such implementation should not be considered to be beyond the scope of this application.

A person skilled in the art can clearly understand that, for convenience and brevity of description, reference may be made to corresponding processes in the method embodiments for specific working processes of the foregoing system, apparatus, and unit. Details are not described herein again.

In several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but the protection scope of this application is not limited thereto. Any person skilled in the art can easily conceive modifications or replacements within the technical scope of this application, and these modifications or replacements shall fall within the protection scope of this application. Therefore, the protection scope of this application should be subject to the protection scope of the claims.

The invention claimed is:

1. A screen display method, comprising:
   detecting a first touch operation of a user on a first screen of an application, wherein the first touch operation is used to display a second screen of the application;
   displaying the second screen at a screen refresh rate equal to a frame rate of the application in response to the first touch operation, and determining whether the second screen is a target screen, wherein the target screen is at least one preset screen in the application;

when the second screen is the target screen, determining whether a second touch operation of the user on the second screen is detected;

when the second touch operation is detected, determining whether a touch area corresponding to the second touch operation is a target area, wherein the target area is at least one preset area on the target screen;

when the touch area corresponding to the second touch operation is the target area, determining a target screen refresh rate based on the frame rate of the application, wherein the target screen refresh rate is greater than or equal to the frame rate of the application; and displaying the second screen at the target screen refresh rate in response to the second touch operation.

2. The method according to claim 1, wherein when the frame rate of the application is equal to an upper limit of a screen refresh rate, the target screen refresh rate is equal to the frame rate of the application; or when the frame rate of the application is less than the upper limit of the screen refresh rate, the target screen refresh rate is greater than the frame rate of the application, and is less than or equal to the upper limit of the screen refresh rate.

3. The method according to claim 1, wherein the target screen refresh rate is greater than the frame rate of the application; and after the displaying the second screen at the target screen refresh rate in response to the second touch operation, the method further comprises:

determining whether a third touch operation of the user on the second screen is detected; and adjusting the target screen refresh rate based on a detection status of the third touch operation.

4. The method according to claim 3, wherein the method further comprises:

recording an operation time of the second touch operation, and determining the operation time of the second touch operation as a target time; and the adjusting the target screen refresh rate based on a detection status of the third touch operation comprises:

if the third touch operation is not detected, recording, based on the target time, duration of a touch operation corresponding to the target time; and when the duration is greater than or equal to preset duration, adjusting the target screen refresh rate to be equal to the frame rate of the application.

5. The method according to claim 4, wherein the adjusting the target screen refresh rate based on a detection status of the third touch operation comprises:

if the third touch operation is detected, determining whether a touch area corresponding to the third touch operation is the target area;

when the touch area corresponding to the third touch operation is not the target area, recording, based on the target time, duration of a touch operation corresponding to the target time; and when the duration is greater than or equal to the preset duration, adjusting the target screen refresh rate to be equal to the frame rate of the application.

6. The method according to claim 5, wherein the method further comprises:

when the touch area corresponding to the third touch operation is the target area, recording an operation time of the third touch operation, and updating the target time to the operation time of the third touch operation.

7. The method according to claim 6, wherein the application is a game application, the target screen is a battle screen, and the target area is an area in which a skill icon is located in the battle screen.

8. A terminal device, comprising:

a detection module, configured to detect a first touch operation of a user on a first screen of an application, wherein the first touch operation is used to display a second screen of the application; and a processing module, configured to: display the second screen at a screen refresh rate equal to a frame rate of the application in response to the first touch operation, and determine whether the second screen is a target screen, wherein the target screen is at least one preset screen in the application; when the second screen is the target screen, determine whether a second touch operation of the user on the second screen is detected; when the second touch operation is detected, determine whether a touch area corresponding to the second touch operation is a target area, wherein the target area is at least one preset area on the target screen; when the touch area corresponding to the second touch operation is the target area, determine a target screen refresh rate based on the frame rate of the application, wherein the target screen refresh rate is greater than or equal to the frame rate of the application; and display the second screen at the target screen refresh rate in response to the second touch operation.

9. The terminal device according to claim 8, wherein when the frame rate of the application is equal to an upper limit of a screen refresh rate, the target screen refresh rate is equal to the frame rate of the application; or when the frame rate of the application is less than the upper limit of the screen refresh rate, the target screen refresh rate is greater than the frame rate of the application, and is less than or equal to the upper limit of the screen refresh rate.

10. The terminal device according to claim 8, wherein the target screen refresh rate is greater than the frame rate of the application; and the processing module is further configured to:

determine whether a third touch operation of the user on the second screen is detected; and adjust the target screen refresh rate based on a detection status of the third touch operation.

11. The terminal device according to claim 10, wherein the processing module is further configured to:

record an operation time of the second touch operation, and determine the operation time of the second touch operation as a target time;

if the third touch operation is not detected, record, based on the target time, duration of a touch operation corresponding to the target time; and when the duration is greater than or equal to preset duration, adjust the target screen refresh rate to be equal to the frame rate of the application.

12. The terminal device according to claim 11, wherein the processing module is further configured to:

if the third touch operation is detected, determine whether a touch area corresponding to the third touch operation is the target area;

when the touch area corresponding to the third touch operation is not the target area, record, based on the target time, duration of a touch operation corresponding to the target time; and when the duration is greater than or equal to the preset duration, adjust the target screen refresh rate to be equal to the frame rate of the application.

13. The terminal device according to claim 12, wherein the processing module is further configured to:
when the touch area corresponding to the third touch operation is the target area, record an operation time of the third touch operation, and update the target time to the operation time of the third touch operation.

14. The terminal device according to claim 13, wherein the application is a game application, the target screen is a battle screen, and the target area is an area in which a skill icon is located in the battle screen.

15. A non-transitory computer-readable storage medium, configured to store a computer program, which when executed by a processor, cause the processor to perform a method, the method comprising:
detecting a first touch operation of a user on a first screen of an application, wherein the first touch operation is used to display a second screen of the application;
displaying the second screen at a screen refresh rate equal to a frame rate of the application in response to the first touch operation, and determining whether the second screen is a target screen, wherein the target screen is at least one preset screen in the application;
when the second screen is the target screen, determining whether a second touch operation of the user on the second screen is detected;
when the second touch operation is detected, determining whether a touch area corresponding to the second touch operation is a target area, wherein the target area is at least one preset area on the target screen;
when the touch area corresponding to the second touch operation is the target area, determining a target screen refresh rate based on the frame rate of the application, wherein the target screen refresh rate is greater than or equal to the frame rate of the application; and
displaying the second screen at the target screen refresh rate in response to the second touch operation.

16. The non-transitory computer-readable storage medium according to claim 15, wherein when the frame rate of the application is equal to an upper limit of a screen refresh rate, the target screen refresh rate is equal to the frame rate of the application; or when the frame rate of the application is less than the upper limit of the screen refresh rate, the target screen refresh rate is greater than the frame rate of the application, and is less than or equal to the upper limit of the screen refresh rate.

17. The non-transitory computer-readable storage medium according to claim 15, wherein the target screen refresh rate is greater than the frame rate of the application; and after the displaying the second screen at the target screen refresh rate in response to the second touch operation, the method further comprises: determining whether a third touch operation of the user on the second screen is detected; and adjusting the target screen refresh rate based on a detection status of the third touch operation.

18. The non-transitory computer-readable storage medium according to claim 17, wherein the method further comprises: recording an operation time of the second touch operation, and determining the operation time of the second touch operation as a target time; and the adjusting the target screen refresh rate based on a detection status of the third touch operation comprises: if the third touch operation is not detected, recording, based on the target time, duration of a touch operation corresponding to the target time; and when the duration is greater than or equal to preset duration, adjusting the target screen refresh rate to be equal to the frame rate of the application.

19. The non-transitory computer-readable storage medium according to claim 18, wherein the adjusting the target screen refresh rate based on a detection status of the third touch operation comprises: if the third touch operation is detected, determining whether a touch area corresponding to the third touch operation is the target area; when the touch area corresponding to the third touch operation is not the target area, recording, based on the target time, duration of a touch operation corresponding to the target time; and when the duration is greater than or equal to the preset duration, adjusting the target screen refresh rate to be equal to the frame rate of the application.

20. The non-transitory computer-readable storage medium according to claim 19, wherein the method further comprises: when the touch area corresponding to the third touch operation is the target area, recording an operation time of the third touch operation, and updating the target time to the operation time of the third touch operation.

* * * * *